(12) United States Patent
Adams et al.

(10) Patent No.: US 11,215,212 B2
(45) Date of Patent: Jan. 4, 2022

(54) TAKEDOWN PIN AND TOOL-LESS PIVOT PIN FOR FIREARMS

(71) Applicant: Swiss CNC LLC, Montgomery, TX (US)

(72) Inventors: Christopher S. Adams, Montgomery, TX (US); Kenneth Craig Ridlehuber, Montgomery, TX (US); Travis Henry Bendele, Montgomery, TX (US)

(73) Assignee: Swiss CNC LLC, Montgomery, TX (US)

( * ) Notice: Subject to any disclaimer, the term of this patent is extended or adjusted under 35 U.S.C. 154(b) by 611 days.

(21) Appl. No.: 16/122,345

(22) Filed: Sep. 5, 2018

(65) Prior Publication Data
US 2019/0072123 A1 Mar. 7, 2019

Related U.S. Application Data

(60) Provisional application No. 62/554,151, filed on Sep. 5, 2017, provisional application No. 62/572,254, filed on Oct. 13, 2017.

(51) Int. Cl.
| | |
|---|---|
| *F16B 19/02* | (2006.01) |
| *F16C 11/02* | (2006.01) |
| *F41A 11/00* | (2006.01) |
| *F41A 3/66* | (2006.01) |

(52) U.S. Cl.
CPC .............. *F16B 19/02* (2013.01); *F16C 11/02* (2013.01); *F41A 11/00* (2013.01); *F41A 3/66* (2013.01)

(58) Field of Classification Search
CPC ........... F41A 11/00; F41A 11/04; F41A 11/02; F41A 3/66; F41A 3/64; F16B 19/02; F16C 11/02
USPC ............................................................ 403/14
See application file for complete search history.

(56) References Cited

U.S. PATENT DOCUMENTS

| | | | |
|---|---|---|---|
| 7,937,876 B1 * | 5/2011 | Graham .................. | F41A 11/00 42/75.03 |
| 9,151,555 B1 * | 10/2015 | Huang ..................... | F16B 15/02 |
| 9,243,857 B2 * | 1/2016 | Mills ........................ | F41A 35/00 |
| 9,389,031 B2 * | 7/2016 | Gardner .................... | F41A 3/66 |

(Continued)

*Primary Examiner* — Joshua E Freeman
(74) *Attorney, Agent, or Firm* — Winstead PC

(57) ABSTRACT

An improved pivot pin for a firearm may provide a head, shank, and/or openings. The improved pivot pin may also provide a modified central channel, an installation point, and/or installation channel to allow for tool-free or tool-less installation. Further, the improved pivot pin may provide a removal channel to allow the pivot pin to easily be removed from the lower receiver without tools. An improved takedown pin for a firearm may provide a head, shank, and/or openings. The improved takedown pin may also provide a modified center channel and/or removal channel as well. A removal tool to aid removal of a pivot pin or takedown pin from a firearm may be generally shaped to conform or fit within the channel of the pivot or takedown pin. The width and height of the removal tool may be slightly smaller than the width and height of the channel of the pivot pin or takedown pin. The distal end of the removal tool may taper from a top surface to the bottom surface to form a sharp point or tip. A shank of any conventional or aftermarket pivot pin, takedown pin, or reinstallation tool may be modified to provide a storage cavity sized to receive the removal tool.

21 Claims, 11 Drawing Sheets

(56) References Cited

U.S. PATENT DOCUMENTS

| | | | |
|---|---|---|---|
| 9,400,006 B1* | 7/2016 | Huang | F16B 21/125 |
| D762,804 S * | 8/2016 | Gardner | D22/108 |
| 9,909,828 B1* | 3/2018 | Klein | F41A 3/66 |
| 10,101,107 B1* | 10/2018 | Huang | F41A 3/66 |
| 10,126,078 B1* | 11/2018 | Harris | F16B 21/12 |
| 10,267,584 B2* | 4/2019 | Kasanjian-King | F41A 11/00 |
| D865,105 S * | 10/2019 | Oglesby | D22/108 |
| 10,578,380 B2* | 3/2020 | Jen | F41A 3/66 |
| 10,663,239 B2* | 5/2020 | Timmons | F41A 11/02 |
| D886,934 S * | 6/2020 | Geissele | D22/108 |
| 10,746,486 B2* | 8/2020 | Jen | F41A 3/66 |
| D898,858 S * | 10/2020 | Geissele | D22/108 |
| 10,866,042 B1* | 12/2020 | Huang | F41A 11/00 |
| 2013/0055610 A1* | 3/2013 | Watkins | F41A 11/04 42/16 |
| 2013/0205637 A1* | 8/2013 | Patel | F41A 11/02 42/75.02 |
| 2014/0317982 A1* | 10/2014 | Gentilini | F41A 3/12 42/16 |
| 2015/0308768 A1* | 10/2015 | Mills | F41A 35/00 42/75.03 |
| 2017/0016690 A1* | 1/2017 | Timmons | F41A 11/00 |
| 2017/0051546 A1* | 2/2017 | Seekins | F41A 35/00 |
| 2017/0299292 A1* | 10/2017 | Daley, Jr. | F41A 3/66 |
| 2018/0187989 A1* | 7/2018 | Jen | F41A 3/66 |
| 2019/0072123 A1* | 3/2019 | Adams | F41A 11/00 |

* cited by examiner

TAKEDOWN PIN AND TOOL-LESS PIVOT PIN FOR FIREARMS

RELATED APPLICATIONS

This application claims the benefit of U.S. Provisional Patent Application Nos. 62/554,151 filed on Sep. 5, 2017 and 62/572,254 filed Oct. 13, 2017, which are incorporated herein by reference.

FIELD OF THE INVENTION

This invention relates to improved designs for takedown pins or pivot pins in firearms, including a firearm removal tool.

BACKGROUND OF INVENTION

FIG. 1 shows lower receiver assembly of a prior art rifle illustrating the pivot and takedown pins. A lower receiver 5 portion of a firearm or rifle may include a pivot 1 and takedown 2 pins that aid in securing the upper receiver (not shown) to the lower receiver. The lower receiver 5 may provide takedown 7 and pivot 9 pin openings for receiving the pivot 1 and takedown 2 pins. The lower receiver 5 may also provide spring/dent opening 10 for receiving a takedown spring 15 and dent 20, as well as another spring/dent opening 25 for receiving a pivot spring 30 and dent 35. Both the pivot 1 and takedown 2 pins are channeled to respectively receive takedown dent 20 and pivot dent 35, which are forced into the channel of the pins by springs 15, 30. When the firearm is fully assembled and ready for use, the pivot 1 and takedown 2 pins are completely depressed into the firearm and locked into position, such as into the lower receiver 5, and the pivot dent 35 and takedown dent 20 are both forced into openings or depressions in the channels of the pivot 1 and takedown 2 pins that may secure the pins in place. The firearm may be partially disassembled by forcing pivot 1 and/or takedown 2 pins out of their depressed positions. In this partially disassembled position, the pivot and takedown dents 20, 35 are respectively caught in the channels of the pivot 1 and takedown 2 pins, as the channels in the pins do not run the entire length and prevent the pins from being completely removed from the lower receiver 5. Even when the pins (e.g. certain pivot pins?) allow sufficient clearance for removal from the lower receiver without depressing the corresponding dent, it is not desirable to do so—as the sprung detent will be forced out of the detent opening without something present to retain the detent. If complete removal of the pivot 1 or takedown 2 pins is desired, the takedown or pivot dent 20, 35 is depressed to clear the channel in the pin and allow the pin to be removed. Generally, special tools may be desirable to depress the pivot dent 35 for removal of pins 1, whereas the takedown pin 2 may require removal a castle nut and backplate (not shown) to unspring the takedown detent 20. Similarly, the special tools may also be desirable during installation of takedown and pivot pins, as the takedown and pivot dent must also be depressed during installation of pins 1, 2. It should also be noted that removal of the castle nut and backplate is further complicated when the castle nut has been staked in place. While other general tools (e.g. pliers, screwdrivers, etc.) can be utilized, the takedown dent 20 and pivot dent 35 are very small and are sometimes lost during installation or disassembly, as the compressed dent springs 15, 30 may force the dents away from the lower receiver 5 if the assembler is not careful during installation or disassembly.

Improved takedown and/or pivot pins, as well as tools for removal of such pins, are discussed further herein.

SUMMARY OF INVENTION

In one embodiment, an improved pivot pin for a firearm may provide a head, shank, and openings like a conventional pivot pin. The improved pivot pin may also provide a modified central channel, an installation point, and installation channel to allow for tool-free or tool-less installation. Further, the improved pivot pin may provide a removal channel to allow the pivot pin to easily be removed from the lower receiver without tools. An improved takedown pin for a firearm may provide a head, shank, and openings like a conventional takedown pin. The improved takedown pin may provide a modified center channel. In some embodiments, the takedown pin may further include a removal channel as well.

In yet another embodiment, a firearm pin removal tool is provided. The removal tool may be generally shaped to conform or fit within the channel of a pivot pin or takedown pin. The width and height of the removal tool may be slightly smaller than the width and height of the channel of the pivot pin or takedown pin. The length of the removal tool is selected to avoid covering the opening for receiving the detent pin at the distal or lower end of the pivot pin or takedown pin. The distal end of the removal tool may taper from a top surface to the bottom surface to form a sharp point or tip. In some embodiments, the tapered surface of the distal end may be a straight, concave, or convex taper. In some embodiments, the tapered surface may be concave or convex between the tip and end meeting the top surface of tool, between the sides of the tool, or a combination thereof. The shape of the point or tip of the distal end may be flat, pointed (e.g. shovel-shaped or fountain-pen shaped), V-shaped or U-shaped, combinations thereof, or any other suitable shape.

In another embodiment, the removal tool may be stored in a pivot pin, takedown pin, or reinstallation tool. Nonlimiting examples may include pins and/or tools discussed herein, conventional pins or tools, or the like. The shank of a pivot pin, takedown pin, or reinstallation tool may be modified to provide a storage cavity sized to receive the removal tool. The storage cavity for the removal tool may be positioned on the shank to avoid interference with any other channels provided by the pivot pin, takedown pin, or reinstallation tool. In some embodiments, the storage cavity prevents removal of the tool from the takedown or pivot pin while the pin is fully installed in the lower receiver and prevents the tool from a falling out during normal use. In some embodiments, the removal tool may be retained in the storage cavity with tape, a magnet embedded in the body of the removal tool, takedown pin, pivot pin, or installation tool (assuming ferromagnetic material is present it the corresponding component the magnet is to be attracted to), a slide mechanism, a rotating mechanism such as a screw with an asymmetrical head, a sleeve, pressure-sensitive adhesive, or other means.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
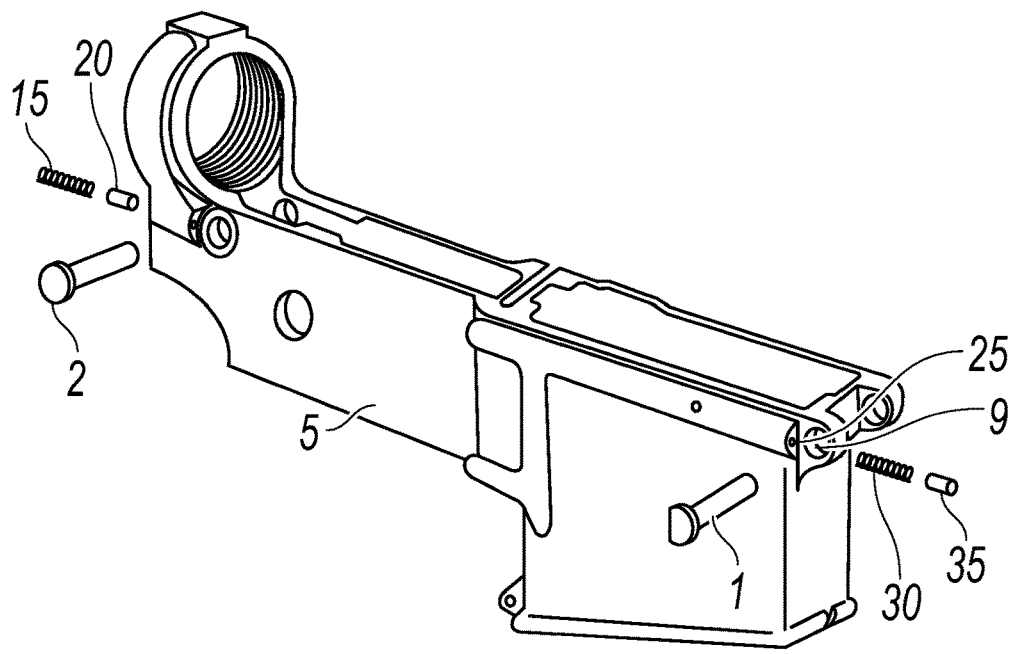
FIG. 1 shows a lower receiver assembly of a prior art rifle.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Figure 2:
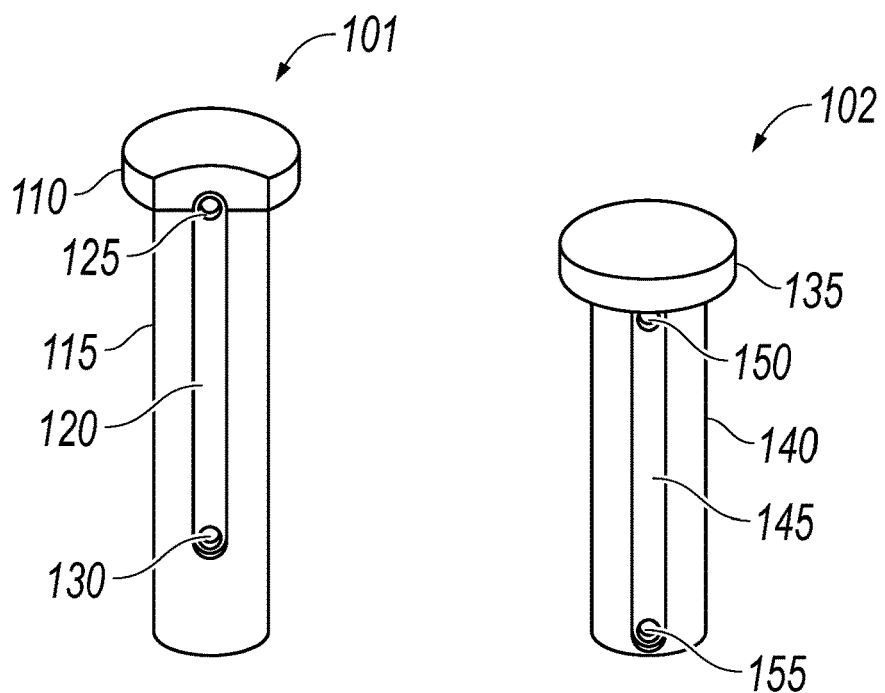
FIG. 2 shows a conventional pivot pin and takedown pin.

FIG. 2 shows a prior art illustration of conventional pivot 101 and takedown 102 pins. Conventional pivot 101 and takedown 102 pins generally consist of heads 110, 135 and shanks 115, 140. Notably, a portion of the circular head 110 of pivot pin 101 is cut away to provide a flat surface that aligns with the flat surface of the lower receiver providing the spring/dent opening for the pivot pin. In addition, pivot 101 and takedown 102 pins may also provide channels 120, 145 on the surface of the shanks 115, 140 that run parallel the central axis of the pivot/takedown pins. As utilized herein, "central axis" shall be understood to refer to a central axis of a generally cylindrically-shaped shank of a pin or tool. As shown, channels 120, 145 are both on provided on the surface of the shanks 115, 140, and are both parallel to the central axis. Further, channels 120, 145 run in a straight line. At the top of the pins 101, 102, the channels 120, 145 respectively provide top and bottom openings 125, 150 (or depressions) for receiving dents when the pins are installed in the lower receiver and fully depressed, which may be referred to herein as an installed state or position. As the pins are retracted from a fully depressed position, the dents are forced out of the openings 125, 150 and run along channels 120, 145. It shall be apparent to one of ordinary skill in the art that the dents respectively remain in channels 120, 145 due to springs forcing the dents into the channels.

At the bottom of pins, 101, 102, the channels 120, 145 respectively provide openings 130, 155 (or depressions) for receiving dents when the pins are retracted from the lower receiver. Once the pins 101, 102 are retracted to where the dents reach the bottom of channels 120, 145 and forced into openings 130, 155, the pins may be considered to be in a partially disassembled state or position. In the partially disassembled state, the tips of the shanks 115, 140 of pins 101, 102 remain in the lower receiver. It shall be apparent to one of ordinary skill that the pivot pin 101 and the takedown pin 102 cannot be easily removed from the lower receiver since the channels 120, 145 end before the bottom or tip of the pins, which prevents the dents disengaging from the channels. Because the dents are spring loaded, the dents must be depressed and the springs must be compressed to disengage from the channels 120, 145. The pins 101, 102 may be considered to be in a fully disassembled state or position when they are removed or separated from the lower receiver.

While the illustrative examples of a rifle or firearm may be recognized as examples of AR-15 variants or M16 variants, it shall be understood by one of ordinary skill in the art that any other firearms utilizing pivot pins and/or takedown pins may also implement similar improvements to those discussed herein.

Improved designs for takedown pins or pivot pins for firearms are discussed herein. An improved pivot pin for a firearm may provide a head, shank, and/or openings like a conventional pivot pin. The improved pivot pin may also provide a modified central channel, an installation point, and/or installation channel to allow for tool-free or tool-less installation. Further, the improved pivot pin may provide a removal channel to allow the pivot pin to easily be removed from the lower receiver without tools. An improved takedown pin for a firearm may provide a head, shank, and/or openings like a conventional takedown pin. The improved takedown pin may provide a modified center channel. In some embodiments, the takedown pin may also include a removal channel as well. The improved pivot and takedown pins are compatible with conventional, standard, or OEM detents, as well as some aftermarket detents. It shall be understood that many of the features discussed for a pivot pin may be applicable to a takedown pin or vice versa. Thus, the various features discussed below shall be understood to be suitable for a takedown or pivot pin (regardless of whether it is discussed in the context of a pivot pin or takedown pin), unless otherwise expressly stated.

Pivot Pin

Figure 3A:
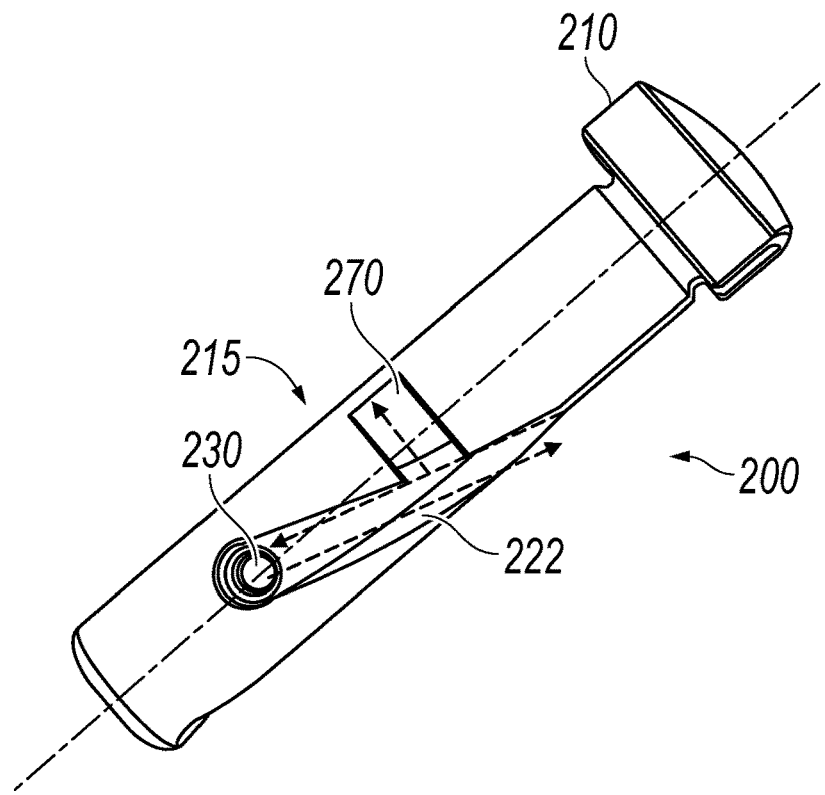
FIGS. 3A-3C shows an improved pivot pin.
Figure 3B:
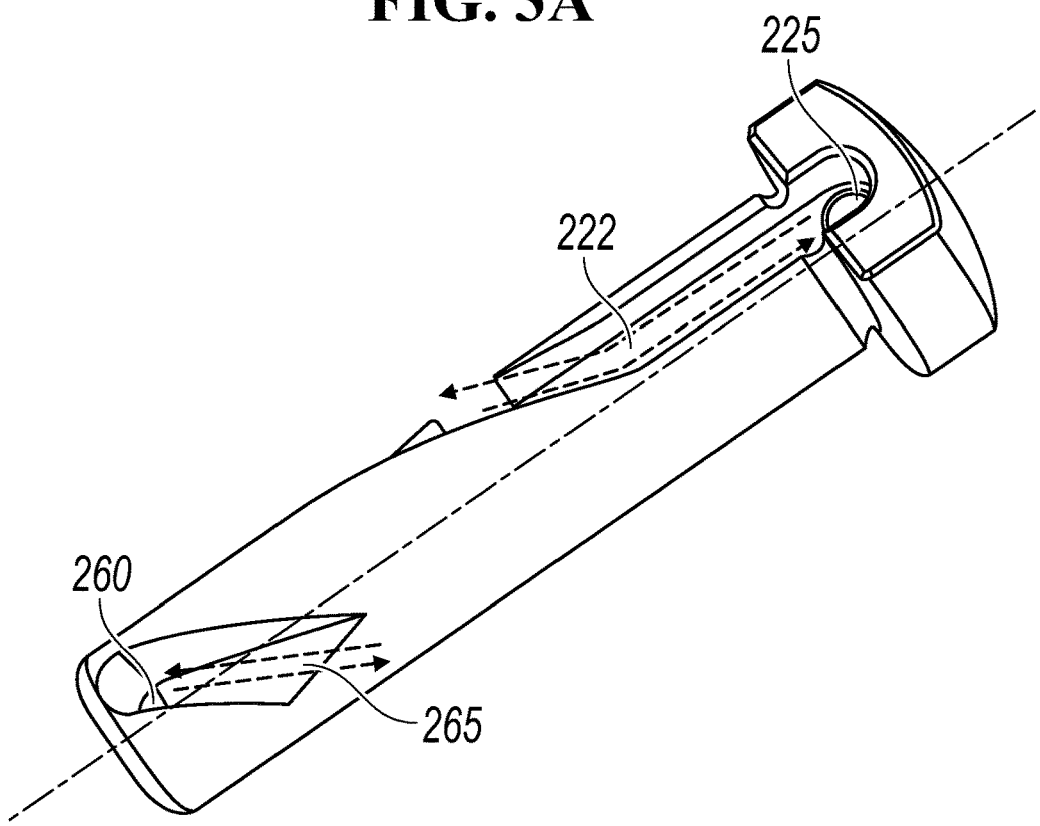
Figure 3C:
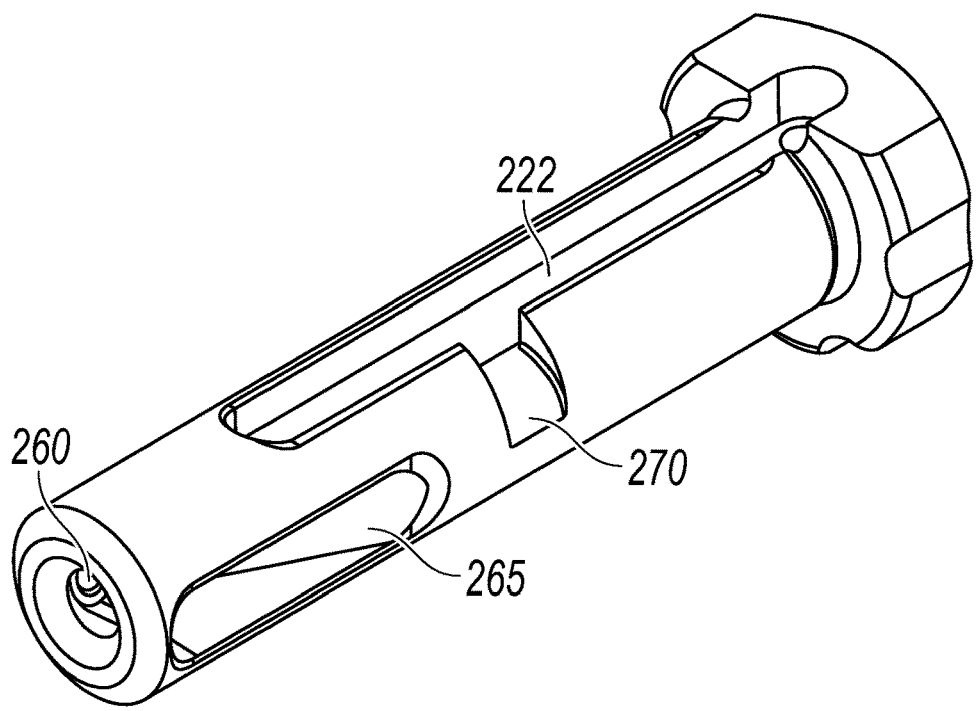

FIGS. 3A-3C shows an illustrative embodiment of an improved pivot pin 200. Like a conventional pivot pin, the improved pivot pin 200 may provide a head 210, shank 215 and openings 225, 230, each serving the same functions as discussed previously. Pivot pin 200 also provides a channel 222 (or "central or center channel" to prevent confusion in further discussion). Central channel 222 may be modified from a conventional straight arrangement along the central axis. In some embodiments, the central channel 222 may be fully or partially arranged in a helical manner round the shank 215. Notably, the helical shape of central channel 222 eases removal of the pivot pin 200. As a nonlimiting example, the central channel 222 may have a top portion that is straight or parallel to the central axis and a bottom portion that is angled in a helical manner around the shank 215. In another embodiment, the entire central channel 222 may be angled in a helical manner around the shank 215. Like conventional channel 130, a top opening 225 may be provided for securing the pivot dent in an installed state/position, and a bottom opening 230 may be provided for securing the pivot dent in a partially disassembled state/position. However, the pivot pin 200 is modified as further discussed herein to allow for an entirely tool-free or tool-less assembly/disassembly process.

With a conventional pivot pin, an installer would require a tool to secure/depress the pivot dent and spring in the spring/dent opening of the lower receiver, and subsequently, the pivot pin is placed in the pivot pin opening (see FIG. 1). When the pivot pin is fully installed, it secures the upper receiver of the firearm to the lower receiver. Some alternative designs (not shown) provide an opening that runs through the entire shank of the pivot pin, which is larger than the pivot spring and dent. This allows the pivot pin to be aligned with the spring/dent opening, and the spring and/or dent to be installed through the opening afterwards. However, such designs still require a pin or tool to depress the pivot spring and dent sufficiently to pivot pin to be moved further into the lower receiver.

The improved pivot pin 200 allows for tool-free or tool-less installation of the pivot pin, where the pathway during installation is illustrated by arrows. An installation point 260 is provided near the tip of the pivot pin 200 at the end of the installation channel 265. Notably, the installation point 260 is lower on the shank 215 of the pivot pin 200 than conventional opening 130 on a conventional pivot pin 101 to allow clearance for installation before the tip of the pivot pin is inserted into the pivot pin opening of the lower receiver. Also, the installation point 260 does not run entirely through the shank 215 to the other side, whereas some conventional pivot pins facilitate installation with special tools by providing an opening 130 that runs through the entire shank. The installation point 260 may allow a pivot dent to be loosely secured for installation of the pivot pin 200 into the lower receiver, such as with a machined opening or detent seat. For example, an installer may place the pivot spring 30 into the spring/dent opening 25 of the lower receiver 5 (see FIG. 1). Next, the installer may simply place the pivot dent 35 (OEM dent or any suitable dent) into the installation point 260 of the pivot pin 200, which secures the pivot dent relatively loosely, and while carefully aligning the pivot dent with the spring/dent opening 25, the pivot spring 30 and the tip of the pivot dent may be forced into the spring/dent opening with the pivot pin. The installer may then force the tip of the pivot pin 200 into pivot pin opening 9, thereby causing the pivot spring 30 and dent 35 to be securely depressed in spring/dent opening and the tip of the pivot pin to be secured in the pivot pin opening. It should be noted that the term "installation" and "reinstallation" are utilized interchangeably throughout the discussion provided herein. Thus, it shall be understood that features for installation are also suitable for reinstallation or vice versa.

The installation point 260 is part of the installation channel 265. As shown in FIG. 3, installation channel 265 is a helically-shaped or angled channel that begins at installation point 260. The installation channel 265 is also distinct and separate from center channel 222. While a helical/angled channel is shown to aid installation, a straight channel or any other suitable channel shape may be acceptable in other embodiments. Starting from installation point 260, the installation channel 265 runs helically about the central axis or around the shank 215. While the example of the installation channel 265 shown runs clockwise around shank 215, in other embodiments, the installation channel may run counterclockwise. In some embodiments, as the installation channel 265 curves around shank 215 or moves toward the head of the pin, the channel gradually rises or reduces in depth until it reaches the outer diameter of the shank. In some embodiments, the installation channel 265 curves around shank 215 to reach the center channel 222. Further, the installation channel 265 may have any suitable pitch or angle. When viewing the pivot pin 200 from the central axis, the installation channel 265 may run approximately 90 degrees or less around the shank (either clockwise or counterclockwise). In some embodiments, the installation channel 265 may run 180 degrees or less around the shank (either clockwise or counterclockwise). In some embodiments, the installation channel 265 may run 270 degrees or less around the shank (either clockwise or counterclockwise). In some embodiments, the installation channel 265 may run 360 degrees around the shank (either clockwise or counterclockwise) to meet the center channel 222.

Returning to the installation discussion, after the pivot spring/dent are secured in spring/dent opening and the tip of the pivot pin is secured in the pivot pin opening, the installer may rotate the pivot pin 200 clockwise or counterclockwise in accordance with the direction of the installation channel 265. It shall be apparent that the tip of the pivot dent is secured in and travels along the installation channel 265, which allows the pivot pin 200 to be pushed further into the lower receiver while rotating until the installation channel ends. Once the pivot dent is out of the installation channel 265, the pivot pin 200 may be freely moved along the shank 215 as desired.

To complete installation, the pivot dent may be subsequently aligned with the central channel 222, if necessary, by rotating and/or pushing the pivot pin 200 into the lower receiver. Once aligned, the tip of the pivot dent is forced into the central channel 222 by the spring. Thus, the tip of the pivot dent cannot escape the central channel 222 and can only follow the pathway of the central channel. Next, the pivot pin 200 may be fully pushed into the lower receiver until the pivot dent reaches the top opening 225 at the top of the central channel 222, which locks the pivot pin in place in the installed position or state.

Pivot pin 200 may also provide a removal channel 270. Removal channel 270 may be oriented approximately perpendicular to the central axis or central channel 222. Further, the removal channel 270 is connected to central channel 222. Where the removal channel 270 and central channel 222 meet, the removal channel may share the same initial channel depth as the central channel. While the example of the removal channel 270 shown runs counterclockwise around shank 215, in other embodiments, the removal channel may run clockwise. It should be noted however that the bottom portion of the central channel 222 is helically curved in a clockwise manner about the shank 215 (when starting from the bottom of the central channel). It is preferable for the removal channel 270 and central channel 222 to have differing orientations (e.g. clockwise/counterclockwise) to prevent accidental removal while the pivot pin is pulled out. As pivot pin 200 is pulled out, once the pivot dent reaches the bottom portion (or angled portion) of the central channel 222, the pivot pin will naturally rotate due to the curve or angle in the central channel. The pivot dent will likely push up against one of the sidewalls of the central channel 222, which causes this rotation. For example, the pivot dent will likely push against the right sidewall of central channel 222 as the pivot pin is pulled out of the lower receiver. By orienting the removal channel 270 in a counterclockwise manner, the removal channels starts on the left sidewall of channel 222, thereby minimizing the risk of the pivot dent accidentally entering the removal channel as the pivot pin is pulled away from the receiver.

As removal channel 270 curves around shank 215, the removal channel gradually rises or reduces in depth until it reaches the outer diameter of the shank. In some embodiments, removal channel 270 may be a straight channel, helical channel, or any other suitable channel shape. While the embodiment shown positions the removal channel 270 approximately at the halfway mark of the central channel 222, the removal channel 270 may be positioned anywhere between the two ends of the central channel 222. In some embodiments, removal channel 270 is positioned in the bottom portion (or curved portion) of the central channel 222. In some embodiments, removal channel 270 is positioned in between, where "in between" does not include the top and bottom ends, the two ends of the central channel 222 to avoid the user unintentionally entering the removal channel from either the installed position or partially disassembled position. When viewing the pivot pin 200 from the central axis, the removal channel 270 may run 90 degrees or less around the shank (either clockwise or counterclockwise). In some embodiments, removal channel 270 may run 180 degrees or less around the shank (either clockwise or counterclockwise). In some embodiments, removal channel 270 may run 270 degrees or less around the shank (either clockwise or counterclockwise). It should be apparent that removal channel 270 preferably runs less than 360 degrees to avoid re-intersecting the central channel 222

To discuss the process of removing the pivot pin 200, the pivot pin may be pulled away from the lower receiver, thereby causing the pivot dent to retract from the top opening 225 (pathway during removal or partial disassembly is illustrated by arrows in the opposite direction of those illustrating installation). The tip of the pivot dent remains secure in central channel 222. For a conventional pivot pin 101, the pivot pin may be pulled out from the lower receiver until the pivot dent reaches the bottom opening 130 to secure the pivot pin in the partially disassembled state or position. To fully remove a conventional pivot pin 101 from this partially disassembled state or position, the pivot dent must then be compressed to disengage from the channel 120, such as with a punch or special tool that can be inserted into the opening 130 running through the entire shank 115 Like a conventional pivot pin, the improved pivot pin 200 may be pulled away from the lower receiver in the same manner until pivot dent reaches bottom opening 230 to reach the partially disassembled state or position. However, the improved pivot pin 200 provides removal channel 270, which provides the following alternative. As pivot pin 200 is being pulled away from the lower receiver, the user has the option to align the pivot dent with the removal channel 270, if the user wishes to completely remove the pivot pin. After alignment, the user may rotate the pivot pin 200 in the direction of the removal channel 270 (e.g. counterclockwise in the nonlimiting example in FIGS. 3A-3B), thereby causing the pivot dent to move from the central channel 222 into the removal channel. Because the depth of the removal channel 270 decreases until reaching the outer diameter of the shank 215, the pivot dent is pushed further into the spring/dent opening. Once the pivot dent is out of removal channel 270, the pivot pin 200 may be easily pushed into or pulled away from the lower receiver.

Because the pivot dent is spring loaded, pulling away the pivot pin 200 completely away from the lower receiver is not recommended (although it may be done), as the pivot dent may be easily lost when the spring forces the dent out of the spring/dent opening once the pivot pin is out of the way. Instead, it is recommended that the pivot pin 200 is pulled away and/or rotated until the pivot dent is aligned with the installation channel 265. Once the pivot dent is in the installation channel 265, the pivot pin 200 should be rotated clockwise or counterclockwise (depending on the orientation of installation channel 265) to cause the pivot dent to move towards installation point 260. Once the pivot dent is aligned with installation point 260, the pivot pin 200 may be fully removed from the pivot pin opening of the lower receiver while the pivot dent is retained in the installation point 260. In this fully removed state or position, the pivot pin 200 is completely separated from the lower receiver.

FIG. 3C shows yet another embodiment of a pivot pin. As with the prior embodiments, the pivot pin provides a main channel 222, installation channel 265, and removal channel 270 similar to the prior embodiments. Notably the main channel and installation channel are straight channels running parallel to the central axis of the shank. In some cases, it may be preferable to utilize straight channels and limit the size and/or number of channels utilized. It shall be recognized that channels remove material from the shank, thereby interrupting the circular shape, which may allow for play in the pin when installed. Further, play may allow premature wear on the receiver during use, installation and de-installation, or the like. In some embodiments it may be desirable to avoid a 90 degree offset between channels to avoid up and down play when the pin is installed. Installation channel 265 quickly reduces in depth and spans a minimal length, thereby minimizing such potential play.

Takedown Pin

Referring back to FIG. 1, takedown spring 15 and dent 20 are typically installed through a back end of spring/dent opening 10 at the back of the lower receiver 5 that runs all the way to the takedown pin opening 7 (or the front end of the spring/dent opening 10). The back end of the spring/dent opening 10 may be closed off by a buttstock or butt plate (not shown). In some cases, the buttstock or butt plate may be permanently secured to the lower receiver 5, which makes it difficult to remove an installed takedown pin 2 once the firearm is assembled. Referring to FIG. 2, the takedown dent 20 is secured in channel 145 of a conventional takedown pin 102 when installed in the lower receiver 5. In the installed state or position, takedown pin 102 is fully depressed into the lower receiver 5, and the takedown dent 20 is secured in the top opening 150. In this installed position, the takedown pin 102 secures an upper receiver (not shown) to the lower receiver 5 of the firearm along with the pivot pin 101. The takedown pin 102 may be moved to a partially disassembled state or position by pulling the takedown pin away from the lower receiver 5 until the takedown dent 20 reaches the bottom opening 155 in channel 145. In the partially disassembled position, the takedown pin 102 no longer secures the upper receiver to the lower receiver 5, and if the pivot pin 101 is still installed, the upper receiver may pivot relative to the lower receiver 5 about the pivot pin. As with the pivot pin and spring loaded pivot dent, the spring 15 loaded takedown dent 20 in channel 145 prevents takedown pin 102 from being rotated. Because channel 145 ends before the tip of the takedown pin 102, the takedown pin cannot be easily be removed from the lower receiver 5 without compressing the takedown spring 15 and dent 20 to disengage from channel 145. Notably, the shank diameter of a conventional takedown pin 102 is very close to the diameter of the takedown pin opening 7, thereby leaving very little clearance to compress the takedown spring 15 and dent 20. Further, the takedown pin 102 can be easily reinstalled by placing the upper receiver in a desired position relative to the lower receiver 5 and pushing the takedown pin back into the lower receiver.

Figure 4A:
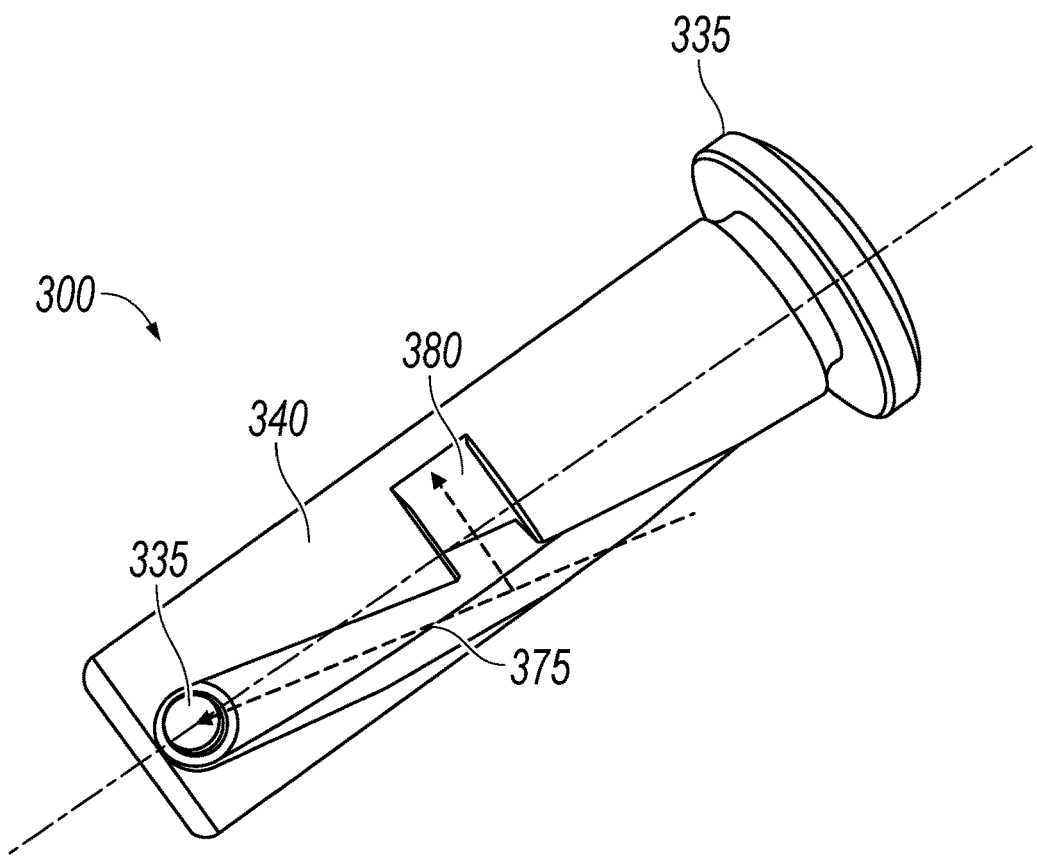
FIGS. 4A-4C shows an improved takedown pin.
Figure 4B:
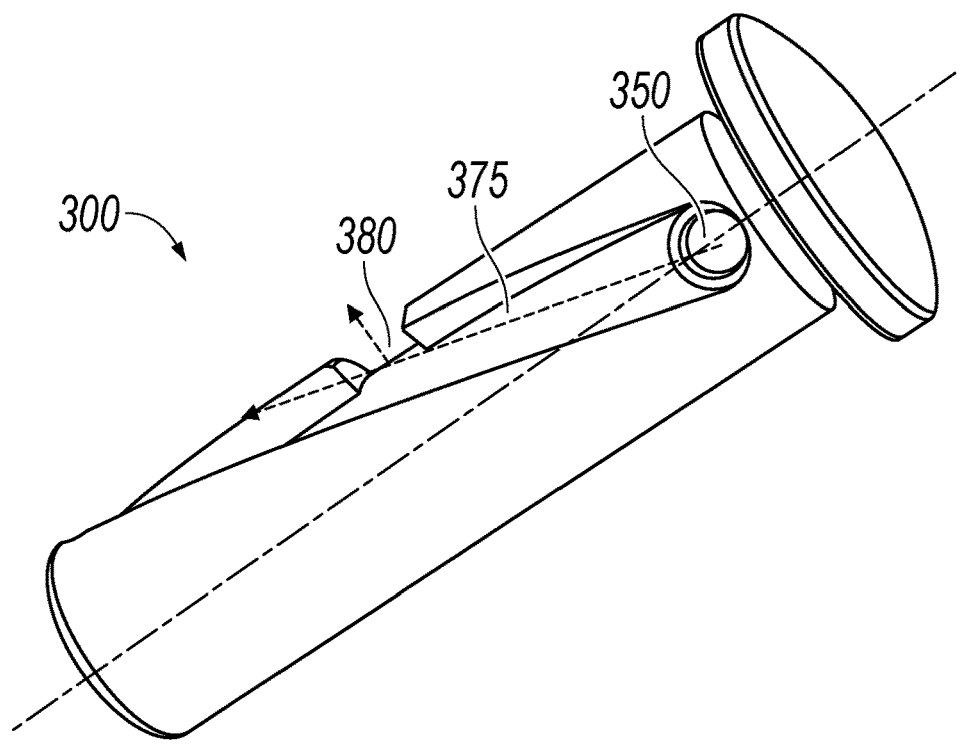

FIG. 4A-4B show an illustrative embodiment of an improved takedown pin 300. Like a conventional takedown pin, the improved takedown pin 300 may provide a head 310, shank 315, and openings 350, 355, each serving the same functions as discussed previously. The takedown pin 300 may also provide a central channel 375, which may be run in a helical or angled manner around the shank 315. The helical shape of the central channel 375 aids in removal of takedown pin 300. The top end of the central channel 375 may provide a top opening 350 for receiving the takedown dent in the installed state/position. The bottom end of the central channel 375 may provide a bottom opening 355 for receiving the takedown dent in the partially disassembled state/position.

Removal channel 380 may be oriented approximately perpendicular to the central axis or central channel 375. Further, the removal channel 380 is connected to central channel 375. Where the removal channel 380 and central channel 375 meet, the removal channel may share the same channel depth as the central channel. While the example of the removal channel 380 shown runs counterclockwise around shank 315, in other embodiments, the removal channel may run clockwise. As removal channel 380 curves around shank 315, the removal channel gradually rises or reduces in depth until it reaches the outer diameter of the shank. In some embodiments, removal channel 380 may be a straight channel, helical channel, or any other suitably shaped channel. While the embodiment shown positions the removal channel 380 approximately at the halfway mark of the central channel 375, the removal channel may be positioned anywhere between the two ends of the central channel. In some embodiments, removal channel 380 is positioned in between, where "in between" does not include the top and bottom ends, the two ends of the central channel 375 to avoid the user unintentionally entering the removal channel from either the installed position or partially disassembled position. When viewing the takedown pin 300 from the central axis, the removal channel 380 may run 90 degrees or less around the shank (either clockwise or counterclockwise). In some embodiments, removal channel 380 may run 180 degrees or less around the shank (either clockwise or counterclockwise). In some embodiments, removal channel 380 may run 270 degrees or less around the shank (either clockwise or counterclockwise). It shall be apparent that removal channel 380 preferably runs less than 360 degrees to avoid re-intersecting the central channel 375.

The takedown pin 300 may be installed when the buttstock or butt plate is separated from the lower receiver. During installation, the takedown pin 300 may be placed in the takedown pin opening 7 to block the front end of the spring/dent opening 10 (see FIG. 1). The takedown dent 20 may then be placed in back end of the spring/dent opening 10 at the back of the lower receiver, and the takedown spring 15 may be placed into the spring/dent opening afterwards. The buttstock or butt plate may then be positioned to compress spring 15 into the spring/dent opening 10. If necessary, the takedown pin 300 may be rotated to align central channel 375 to receive the takedown dent 20, and the takedown pin may then be pushed into the lower receiver 5 if necessary.

Like a conventional takedown pin, the improved takedown pin 300 may be pulled away from the lower receiver 5, but because central channel 375 is helical and receives the takedown dent 20, the takedown pin 300 will rotate as it is pulled away. If the takedown pin 300 is pulled away from the lower receiver 5 until the takedown dent reaches lower opening 355, the takedown pin will reach the partially disassembled state or position (pathway illustrated by arrows in the opposite direction). However, the user may alternatively pull the takedown pin 300 away from the lower receiver 5 until the takedown dent is aligned with the removal channel 380 (pathway illustrated by arrows in the opposite direction). Once aligned with the removal channel 380, the user may turn the takedown pin 380 so the takedown dent 20 follows the pathway of the removal channel. Once the takedown dent 20 is out of the removal channel 380, the user can simply pull away the takedown pin 300 from the lower receiver 5 to fully remove the takedown pin from the lower receiver. In this fully removed state or position, the takedown pin 300 is completely separated from the lower receiver 5. It should be noted that pulling the takedown pin 300 away from the lower receiver 5 until the takedown dent reaches lower opening 355 or into the partially disassembled state/position disables the firearm, as the upper receiver may freely pivot relative to the pivot pin. However, a conventional takedown pin 102 is easily reinstalled from the partially disassembled position by re-aligning the upper and lower receiver, if necessary, and pushing the takedown pin back in. Further, as noted previously, the conventional takedown pin 102 cannot be completely removed from the lower receiver 5 without special tools. With the process of fully removing the improved takedown pin 300 from the lower receiver 5 discussed above, the firearm can be quickly and easily disabled if desired. Fully removing the improved takedown pin 300 may be characterized as "semi-permanent" disablement of the firearm, as the takedown pin cannot be easily or quickly re-installed. To re-install takedown pin 300, the takedown spring 15 and dent 20 must be compressed sufficiently to allow the takedown pin 300 to be pressed through takedown pin opening 7. However, because of the very small clearance between the outer diameter of the shank 315 of takedown pin 300 and takedown pin opening 7, it is extremely difficult to compress takedown spring 15 and dent 20 sufficiently for reinstallation without special tools or taking apart the buttstock or butt plate from the lower receiver. Further, the takedown pin opening 7 is small, thereby making it difficult for a user to compress the takedown spring 15 and dent 20 by hand. Thus, the improved takedown pin 300 allows the user to quickly semi-permanently disable the firearm, such as in a hostile situation, to render the firearm useless to attackers.

Figure 4C:
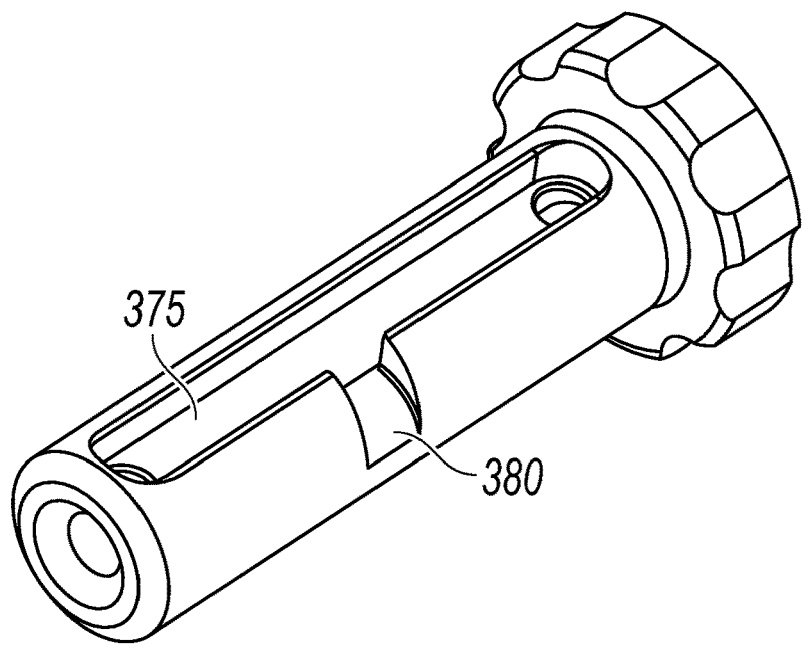
Figure 5A:
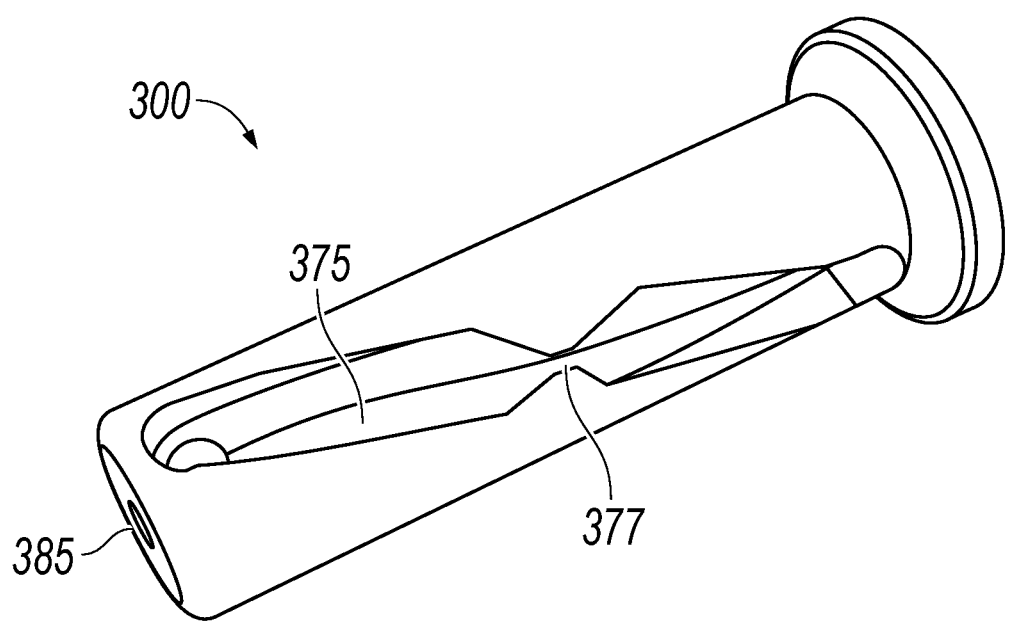
FIGS. 5A-5C show nonlimiting embodiments of takedown pins.

FIG. 4C shows yet another embodiment of a takedown pin. As with the prior embodiments, the takedown pin provides a straight central channel 375 and a removal channel 380 similar to the prior embodiments. Further variations of takedown pins are discussed herein. It shall be understood that the variations discussed herein may include any of the features of takedown pins discussed above, except where conflicting with the designs discussed herein. In some embodiments, the depth of central channel 375 of a takedown pin 300 may vary along its length. For example, the depth of the central channel 375 may decrease and become shallow in a particular portion 377 of the central channel as shown in FIG. 5A, which may allow the takedown pin 300 to be rotated when the takedown dent is aligned with the shallow portion of the central channel 375. The top and bottom portions of central channel 375 gradually increase in depth as they move away from the shallow portion of the channel. The shallow or intermediate portion 377 may meet the outer diameter of takedown pin 300 or very nearly meet the outer diameter. When the takedown pin 300 is thus rotated, the takedown dent is no longer captured within the center channel 375 and the takedown pin 300 may be removed from the lower receiver. Notably, the central channel 375 of varying depth makes removal channel 380 optional. The takedown pin 300 may also provide a locator hole 385, which is discussed in further detail below.

It shall be recognized by one of ordinary skill in the art that similar designs may also be utilized for the pivot pin 200. It shall be understood that the variations discussed herein may include any of the features of pivot pins discussed previously above, except where conflicting with the designs discussed herein. In a similar manner to the design for a takedown pin discussed above, the depth of the central channel 222 in some embodiments of a pivot pin 200 may vary along its length. As a nonlimiting example, central channel 222 (FIGS. 3A-3B) may be modified as shown in FIG. 5A to provide a shallow portion 377. In such an embodiment, the removal channel 265 is optional.

Figure 5B:
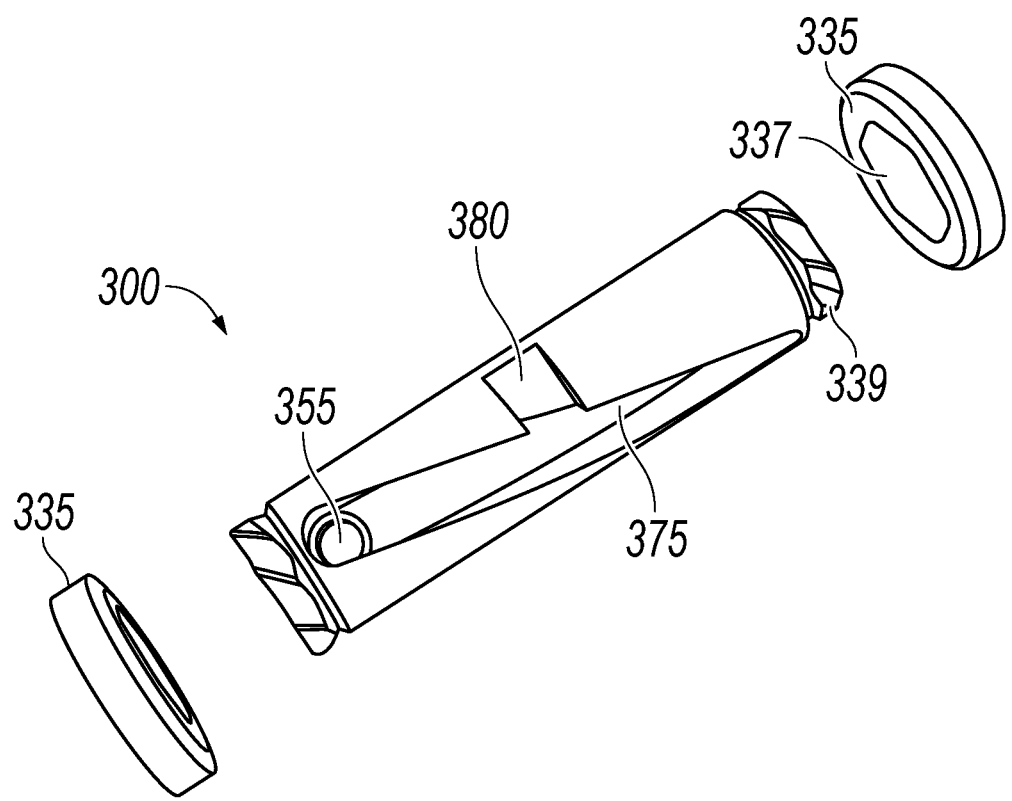

In yet another embodiment or variation of a takedown pin 300 shown in FIG. 5B, removable affixed heads 335 on one or both ends of the pin may be provided. As noted previously, this variation may include any of the features discussed previously above. These heads 335 ensure that the pin 300 cannot be removed or accidently knocked out. Further, the design also allows one shaft to be utilized with any variety of custom head designs or no head design. The heads 335 may provide a head opening 337 with a polygonal shape. The sidewalls of the head openings 337 may have concave or convex contouring. The shank tips 339 may be shaped to have concave or convex contouring that mates with head openings 337. Further, the contouring provided by head opening 337 and shank tip 339 may be oriented in a directional manner, such as helical arranged. For example, the contouring provided by the head opening 337 and shank tip 339 shown may allow clockwise rotation, which forces head opening 337 onto shank tip 339. In contrast, a counterclockwise motion allows removal of the head 335 from the shank tip 339 if desired. In some embodiments, the head 335 can be permanently affixed if desired.

Figure 5C:
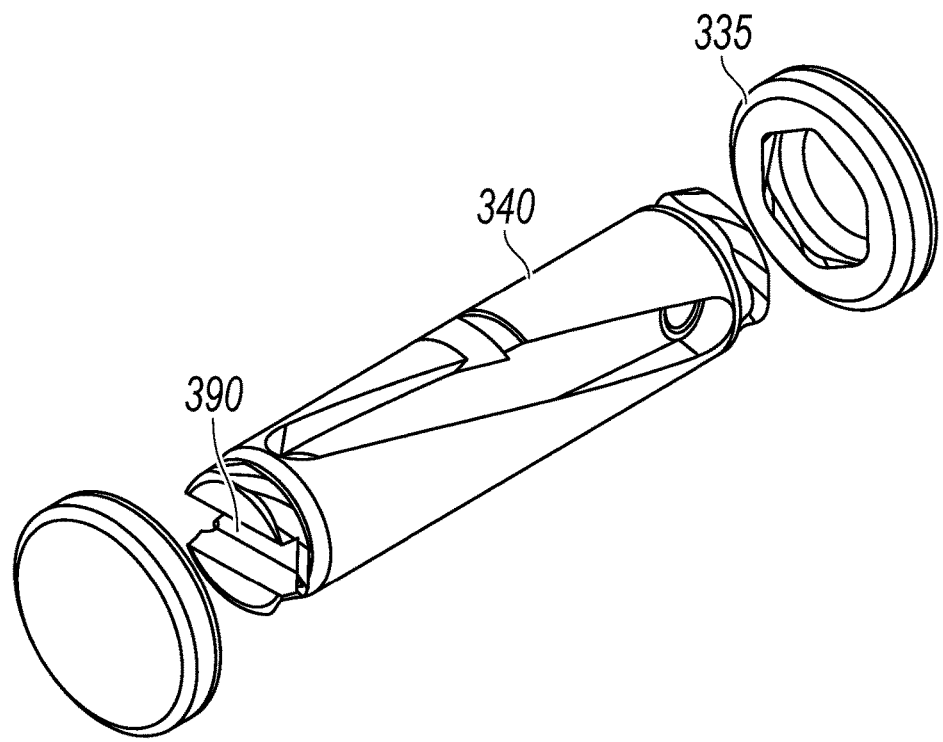

In yet another embodiment or variation of a takedown pin 300 shown in FIG. 5C, an install or reinstallation channel 390 may be provided. As noted previously, this variation may include any of the features discussed previously above. It should be noted that the install/reinstallation channel 390 is not a replacement for the central channel, but rather another channel that may be added to the takedown pin 300. The design of reinstall channel 390 comprises a channel which starts at the bottom or end of the shank 340 opposite the top head 335. The reinstallation channel 390 may traverse a straight path along the shank 340 of the takedown pin 300. The reinstallation channel 390 is deep enough to initially receive the takedown dent when it is fully extended to the forwardmost edge of the takedown pin hole 7 nearest the front portion of the lower receiver 5. As the takedown pin 300 is inserted into the takedown pin hole 7, the takedown dent 20 is captured in the reinstallation channel 390. The depth of the reinstallation channel 390 decreases along the length of the shank 340 until its bottom surface tapers to the main surface or outer diameter of the shank. The point at which the channel depth has decreased to effectively zero may be near the midpoint of the shank 340. Alternately, the reinstallation channel 390 may extend to intersect with the central channel 375 (not shown). While the examples shown illustrate the reinstallation channel 390 as straight channel, in some embodiment, the reinstallation channel 390 may traverse a helical path about the shank 340, rather than a straight path. In some embodiments, the orientation of the reinstallation channel 390 may be may be offset 90 degrees away from the main channel so that it can be formed to the proper depth without interfering with the main channel. In embodiments with channel 390 and removable heads 335, it should be noted that the removable heads cap the reinstallation channel to prevent internal out gassing. Further, one or more of the removable heads could be left off for out gassing necessary when shooting suppressed.

Install/Reinstall Tool for Takedown Pin

Figure 6A:
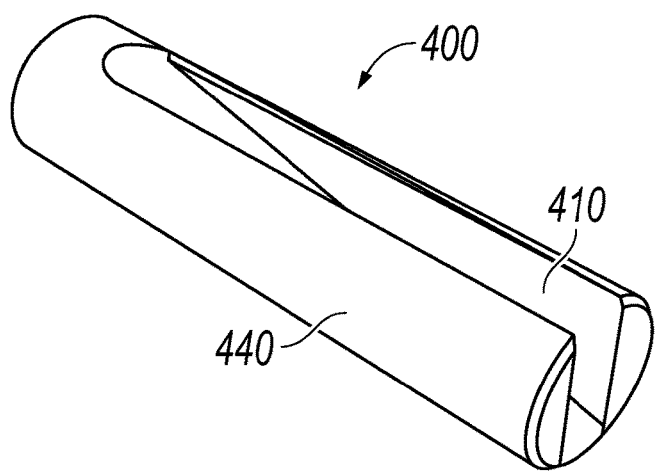
FIGS. 6A-6D show nonlimiting embodiments of install/reinstall tools.
Figure 6B:
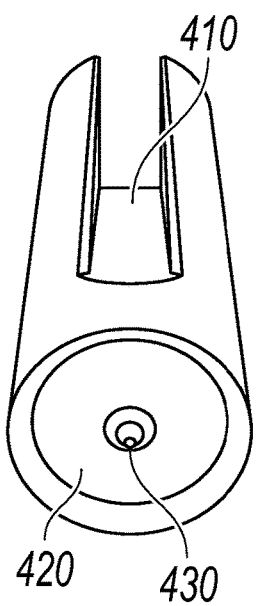
Figure 6C:
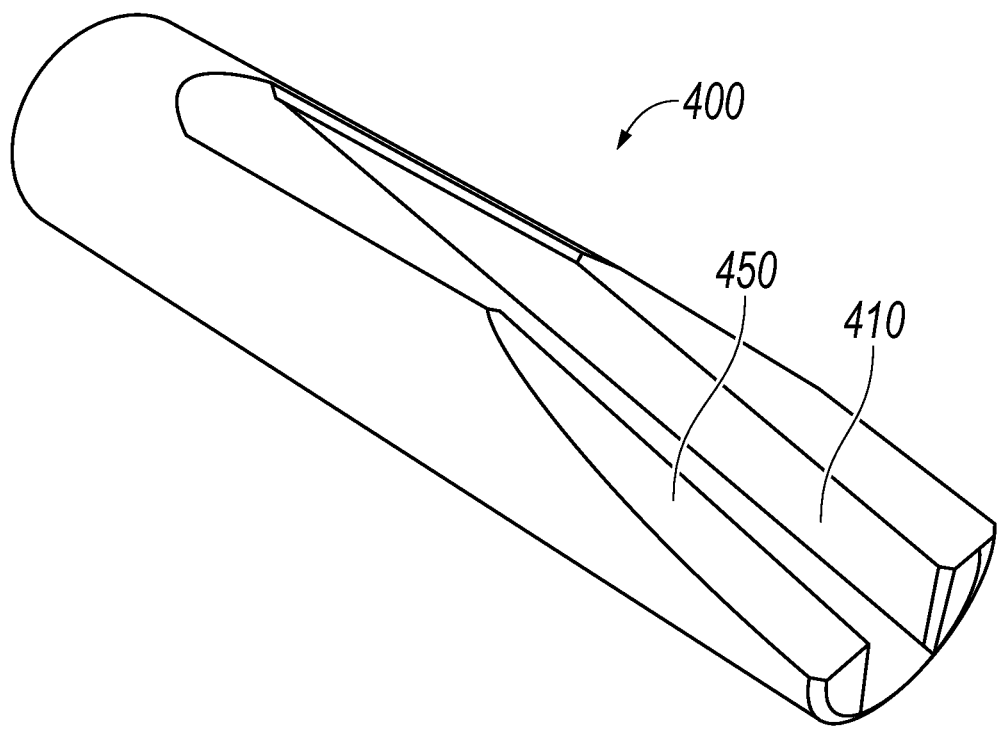

In some embodiments where a tool is needed to install/reinstall take down pin an install or reinstall tool may be utilized. As noted previously above, in some embodiments, any of the designs of installation/reinstallation channels discussed further below may be incorporated into a takedown pin. When it is desirable to reinstall the takedown pin 300, a special tool referred to herein as an install or reinstall tool 400, as shown in FIGS. 6A-6D, may be inserted into takedown pin opening 7 to compress the takedown dent 20 & spring 15 and hold the takedown dent in its spring/dent hole 10 while the takedown pin 300 is inserted into the takedown pin opening of the lower receiver. The diameter of the special tool 400 is ideally the same as that of the shank 340 of the takedown pin 300. An installation or reinstallation channel 410 runs along a shank of the tool 400 and is deep enough to initially receive the takedown dent 20 in a lower receiver 5 when it is fully extended to the forward most edge of the takedown pin hole 7. As the special tool 400 is inserted into the takedown pin hole 7, the takedown dent 20 is captured in the reinstallation channel 410. The depth of the reinstallation channel 410 decreases along the length of the shank 440 until its bottom surface tapers to the main surface or outer diameter of the shank. As shown in FIG. 6B, the surface of the tip of the special tool 400 has a concave surface 420 at the bottom end of the shank opposite the reinstallation groove's deepest end, and as such, the special tool does not have a head like the takedown pin. This concave surface 420 may also be provided in other embodiments discussed further below. The takedown pin 300 is pressed against this concave surface 420 so that it is used to force the special tool 400 out the opposite end (left side) of the lower receiver 5. The takedown dent 20 will, during this movement, slide from the special tool's shank 440 to the takedown pin's shank 340. When the takedown pin dent is resting against the surface of the takedown pin 300, the takedown pin 300 may be rotated, if necessary, until its central channel 375 receives the takedown pin dent.

Further, in some embodiments, the point at which the reinstallation channel depth has decreased to effectively zero may be near the midpoint of the shank 440. While the examples shown illustrate the reinstallation channel 410 as straight channel, in some embodiment, the reinstallation channel may traverse a helical path about the shank 440, rather than a straight path. In some embodiments, a portion of shoulders 450 adjacent to the reinstallation channel 410 may be removed, which may aid machinability of the tool 400.

Figure 6D:
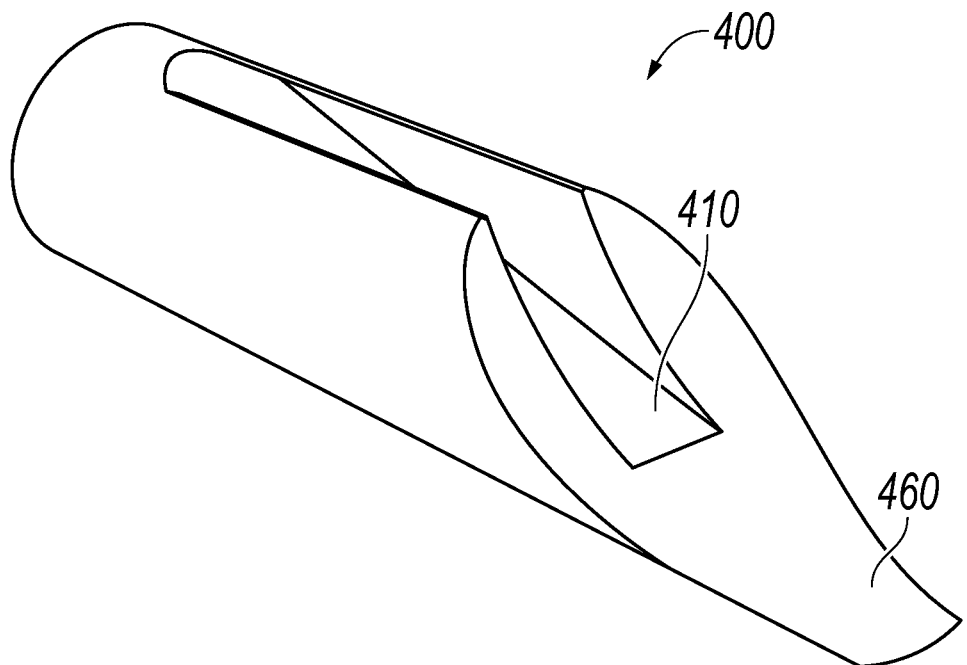

Yet another embodiment of the special tool for reinstallation is shown in FIG. 6D and described herein. The special tool 400 may have a broad receiving area 460 that is thin enough to receive the takedown dent 20 in a similar manner as the install/reinstall channel 410 in other embodiments. However, the receiving area 460 is shaped to be broad to aid ease of installation. The receiving area 460 designed to receive the takedown dent 20 may be formed to a point with the area becoming thicker further from the edge, which may be visualized as a shape similar to that of a fountain pen. In other embodiments, the receiving area 460 designed to receive the takedown dent 20 may be formed with a broader leading edge, e.g. similar to a scoop or spoon that is used for flour or grain. The special tool 400 is pressed into the lower receiver 5 to force the receiving area 460 between the takedown dent 20 and the front edge of the takedown pin hole 7. As the special tool 400 is pressed in, the receiving area 460 gradually forms a reinstallation channel 410 in which the takedown dent 20 is thus captured. As in other embodiments, the reinstallation channel 410 becomes shallower until it meets the outer diameter the special tool 400 so that the takedown spring 15 is compressed until the takedown dent 20 is fully pressed into the spring/dent opening 10. Subsequently, a takedown pin is used to press the special tool out of the other end of the lower receiver 5 and receive the takedown dent 20.

For added security it may be desirable to provide a design that only allows an intended user to install a takedown pin. In some embodiment, the bottom end of the special tool 400 for reinstallation opposite the reinstallation channel may be uniquely keyed to only match up with a correspondingly-keyed takedown pin. As a nonlimiting example, concave surface of the special tool 400 may provide a key 430 (FIG. 6B) that only matches up with a locator hole 390 of a takedown pin 300 keyed in a corresponding manner. Notably, key 430 may be offset from the center of shank 440, and a corresponding locator hole 390 of a matching takedown pin 300 shall be offset to match key 430. In some embodiments, key 430 may be a raised bump that is sufficiently sized to cause a gap larger than takedown dent to be formed between takedown pin 300 and special tool 400 when takedown pin & special tool do not match up (or key 430 and locator 390 are not offset in the same manner). It shall be apparent to one of ordinary skill in the art that this gap due to mismatch between takedown pin 300 and tool 400 would impede installation as the takedown dent would be forced into the gap by the takedown spring during attempted installation. As another nonlimiting example of security measures, if the reinstallation groove in the special tool is helical, it will be necessary to turn the special tool 400 as it is pushed. Only a takedown pin with the bottom end of the shank keyed with the proper shape (e.g. see locator hole 390 in FIG. 5) to engage the keyed end 460 of the special tool 400 (e.g. FIG. 6B) will be able to turn the special tool as needed for reinstallation. For example, some security screws and other hardware have a special shape, which only allow a user to rotate them in one direction. Similarly, keyed portions of a special tool and takedown pin may be shaped to only allow engage for the required rotation when the keyed portions match up.

Firearm Pin Removal Tool

It should be understood that the removal tool discussed herein can be designed for use with the takedown pin and/or the pivot pin. While discussion below may reference the takedown pin, it shall be understood by one of ordinary skill in the art that the design of the removal tool is equally applicable to a takedown pin as well. As discussed above, an installed takedown pin is difficult to remove from the lower receiver of a firearm once a castle nut has been staked in place. Similarly, a pivot pin may be difficult to remove without out losing the associate detent pin.

A tool aiding removal of a takedown pin or pivot pin from a lower receiver of a firearm is discussed herein. In some embodiments, the tool may be suitable for insertion into a channel of conventional or aftermarket takedown pin of a firearm. In some embodiments, the tool may be suitable for insertion into a channel of conventional or aftermarket pivot pin of a firearm. The tool makes it easier to perform disassembly of the firearm without removing the castle nut. Additionally, the tool may obviate the need for any other tools for disassembly of the firearm.

Figure 7:
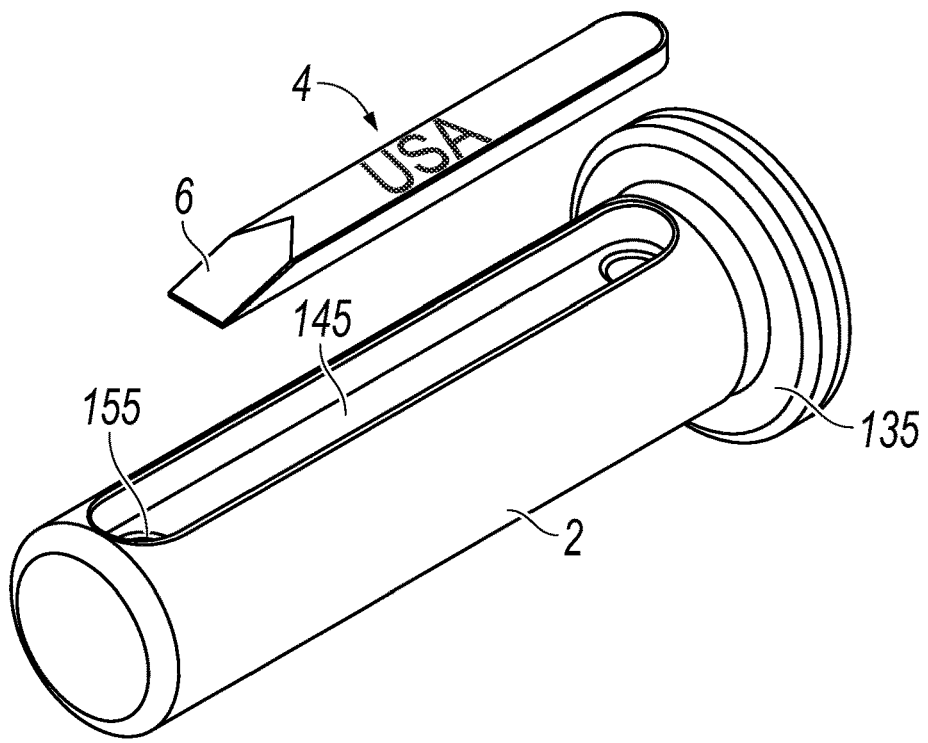
FIG. 7 is an illustrative embodiment of a tool for removal of a takedown pin.

FIG. 7 is an illustrative embodiment of a tool 4 for removal of a takedown pin 2. However, it shall be recognized by one of ordinary skill in the art that the design of tool 4 is also applicable to a pivot pin as well. Tool 4 may be generally described as an insert that fits within a channel 145 provided in the takedown pin 2. The shape of the tool 4 generally conforms to the shape of channel 145. The dimensions of the tool 4 are selected to allow it to fit within the channel 145, including when the takedown pin 2 is installed in the lower receiver. One end 6 of the tool 4 tapers down to a very thin thickness that allows the tool to be inserted between the takedown dent or detent pin 20. In some embodiments, the tool 4 is shaped to fit within a straight channel 145 of the takedown pin. In other embodiments, the tool 4 may be shaped to fit within the channel of other non-conventional takedown pin designs, such as, but not limited to, curved, slanted, or the like and designs discussed previously above.

Tool 4 may be made of any suitable rigid material. Nonlimiting examples may include metal, alloys, plastic, glass, wood, ceramic, or any other rigid material. Tool 4 may be manufactured using any suitable techniques. Nonlimiting examples may include machining, molding, injection molding, casting, 3D printing, laser cutting, polishing, hardening, forming of sheet metal, combinations thereof, or the like.

The tool 4 is designed to fits into the channel 145 of any takedown pin 2 or channel of any pivot pin 1 for a firearm, such as an AR-15 or the like. When assembled properly, the channel of the pivot or takedown pin 2 retains the sprung detent pin 20, 35, which prevents the pivot or takedown pin 2 from being removed from the lower receiver. For the sake of clarity, the end of the pivot or takedown pin 2 with the head is referred to herein as the proximal end, and the opposite end of the pivot or takedown pin is referred to herein as the distal end. In embodiments of pivot or takedown pins with multiple heads for both ends, it shall be understood that the distal end refers to the end inserted into a lower receiver first, and the proximal end refers to the opposite end. Similarly, the proximal end 8 of the tool 4 refers to the end of the tool to be positioned near the head 135 of the takedown pin 2 when properly installed. The removal tool 4 may be generally shaped to conform or fit within the channel of a pivot pin 1 or takedown pin 2. The width and height of the removal tool 4 may be slightly smaller than the width and height of the channel of the pivot pin or takedown pin. In some embodiments, the length of the tool 4 is selected so that the tool does not cover the bottom opening 155 of the pivot 1 or takedown pin 2. As such, the length of the tool 4 is less than the length of the channel of the takedown or pivot. The distal end 6 of the tool 4 refers to the end of the tool near the tip of the pivot 1 or takedown pin 2 when properly installed. As shown, the distal end 6 tapers down from the top surface to the bottom surface of the tool 4 into a sharp point or tip. The distal end 6 of the tool 4 is thin or sharp enough to force detent pin 20, 35 into the spring and detent opening 10, 25 of the lower receiver 5. The tapered surface of the distal end 6 may be straight, concave, or convex taper. Further, it should be understood the tapered surface may be concave or convex between the tip and end meeting the top surface of tool 4, between the sides of the tool, or a combination thereof. The point or tip of the distal end 6 may be flat (as shown), pointed (e.g. shovel-shaped or fountain-pen shaped), V-shaped or U-shaped, combinations thereof, or any other suitable shape.

The detent pins 20, 35 are spring loaded so that in normal operation (absent the tool 4), the detent pin is pressed into contact with the bottom surface of the channel of the pivot 1 or takedown pin 2 by the spring 15, 30 that is embedded in the lower receiver 5. Particularly for a takedown pin, due to the tight fit of the parts (with minimal gaps between surfaces), it is difficult to remove the detent pin 20 from the channel 145 of the takedown pin 2 since the spring must be compressed to disengage the detent pin from the channel. Alternatively, if the detent pin 20 cannot be disengaged from channel 145, the firearm must be disassembled to loosen the castle nut sufficiently to allow the backplate to moved away from a detent pin and spring opening 10, which would allow the spring 15 and detent pin 20 to move sufficiently to disengage from channel 145. As the castle nut is often staked in place by deforming the metal of the nut and body in such a way that turning the castle nut would require grinding or a great deal of torque, it should be apparent that the tool 4 eliminates the significant effort needed to remove conventional takedown pins.

Discussion of the use of the removal tool 4 is discussed further herein. In some embodiments, the removal tool 4 may be utilized after assembly, partial assembly, or prior to assembly of a firearm. In situations prior to assembly, the tool 4 may be placed in channel 145 of the takedown pin 2 before insertion into the lower receiver 5. When the takedown pin 2 is already in the lower receiver 5, the takedown pin 2 is first pulled out of the lower receiver 5 until the detent pin 20 reaches the distal end of the channel 145. The removal tool 4 may then be placed into the channel 145 with the thinnest end 6 in the bottom of the groove at the distal end (near the detent pin). If removal of the takedown pin 2 is desired, the takedown pin with the removal tool 4 in place may be pushed back into the lower receiver 5. This causes the detent pin 20 to be forced into the opening 10 due to the tapered distal end of tool 4 and the spring 15 to be compressed. Because the top surface of tool 4 is level with the surface of takedown pin's shank, the takedown pin 2 may subsequently be rotated so that the detent pin 20 is away from channel 145. Once detent pin 20 is away from channel 145, the takedown pin 2 can be fully removed from the lower receiver 5.

In some embodiments, tool 4 is used to remove a takedown pin or a pivot pin from a firearm, such as an AR-15, AR-10, M16, or variants thereof. As discussed previously, a castle nut may be staked in place, thereby requiring grinding the metal or applying extreme torque to overcome the interference of the metal in order to turn the castle nut, which is necessary to remove a takedown pin and may result in damage to the firearm (e.g. anti-corrosion coating). However, the tool 4 allows removal of a takedown pin without the need to loosen or remove the castle nut.

While the embodiments discussed above discuss a removal tool for a takedown pin, it shall be apparent to one of ordinary skill in the art that the dimensions of the tool may be easily be modified for a pivot pin. In the interest of brevity, the prior discussion of the removal tool (for a takedown pin) is not repeated; however, it shall be recognized by one of ordinary skill in the art that the various designs and different embodiments discussed above are all applicable to a removal tool for a pivot pin as well. In some cases, special tools are utilized to remove a pivot pin, which can be cumbersome and the special tools may be prone to breaking. A removal tool for the pivot pin may avoid such issues.

In yet another embodiment, storage or retrieval of the removal tool discussed above may be a concern. The designs of the body of takedown pins, pivot pins, and/or reinstallation tools may be modified to accommodate storage of the removal tool 4 discussed previously above. Nonlimiting examples may include modified designs of the body of conventional takedown or pivot pins; the takedown pins, pivot pins, or reinstallation tools discussed previously above; or any other takedown pin, pivot pin, or reinstallation tool designs.

In some embodiments, the shank of a pivot pin, takedown pin, or reinstallation tool may be modified to provide a storage cavity. The storage cavity may be sized to suitably receive and store removal tool 4. In some embodiments, the storage cavity is preferably positioned on the shank to avoid interference with any other channels provided by the pivot pin, takedown pin, or reinstallation tool. In a preferred embodiment, the storage cavity is preferably positioned approximately 180° from the main channel retaining the detent pin. This is because the storage cavity and main channel are cutouts that modify the outer perimeter of the shank of a pivot or takedown pin. This change in the outer perimeter may results in some play when the pin is installed in the lower receiver, and it would be preferable to avoid play between the upper and lower receiver when assembled. In other embodiments, if a small amount of play is acceptable, the storage channel may be disposed anywhere along the circumference of the shank of the pivot or takedown pin that does not intersect or interfere with other channels of the pin. As a nonlimiting example, referring to FIG. 2 illustrating conventional pivot and takedown pins, the storage cavity may be position nearly anywhere along the 360° of the shank of the pins (except where channels 120 and 145 are present) such as 90°, 180°, or 270° degrees from channels 120 or 145. As another nonlimiting example, referring to FIGS. 3A-3B, the storage cavity may be positioned on a pivot pin to avoid inferring or intersecting the channel 222, installation channel 265, and removal channel 270. As yet another nonlimiting example, referring to FIGS. 4A-4B, the storage cavity may be positioned on a takedown pin to avoid inferring or intersecting the central channel 375 and removal channel 380. As yet another nonlimiting example, referring to FIGS. 6A-6D, the storage cavity may be positioned on the reinstallation tool to avoid inferring or intersecting channel 410. Further it may be possible to utilize channel 410 as the storage cavity in some cases. In yet another embodiment, the takedown or pivot pin may be hollow to provide the storage cavity, or in other words, the bore of the pin may provide the storage cavity. The storage cavity may be positioned to prevent removal from the takedown or pivot pin while the pin is fully installed in the lower receiver 5, which prevents the removal tool from a falling out during normal use. In some embodiments, the storage cavity is located in a position that allows removal tool to be removed from the storage cavity when the takedown or pivot pin is in a partially disassembled position (i.e. the pivot or takedown pin is pulled out from the lower receiver so that the detent pin is at the distal end of the pin). The storage cavity ensures removal tool(s) can be quickly retrieved. Additionally, the storage cavity prevents accidental removal and the removal tool can only be removed from the firearm intentionally.

In some embodiments, the removal tool may be held in place by any variety of suitable retaining means. Nonlimiting examples may include tape, a magnet embedded in the body of the removal tool, takedown pin, pivot pin, or installation tool (assuming ferromagnetic material is present it the corresponding component the magnet is to be attracted to), a slide mechanism, a rotating mechanism such as a screw with an asymmetrical head that covers a storage cavity provided in the bore of the pin, a sleeve, pressure-sensitive adhesive, or other means.

It is noted that the storage cavity provides at least the following benefits. First, by keeping the removal tool with the firearm, users have access to the removal tool anytime it is needed. The retaining means prevents the removal tool from being lost, as it is quite small. Additionally, even if the user does not need the removal tool, another user may be in need of the removal tool.

It should be note that any variety of the designs discussed above may be combined with one or more of any of the designs discussed above or vice versa. Thus, numerous combinations may be formed from the various combinations of design features.

Figure 8A:
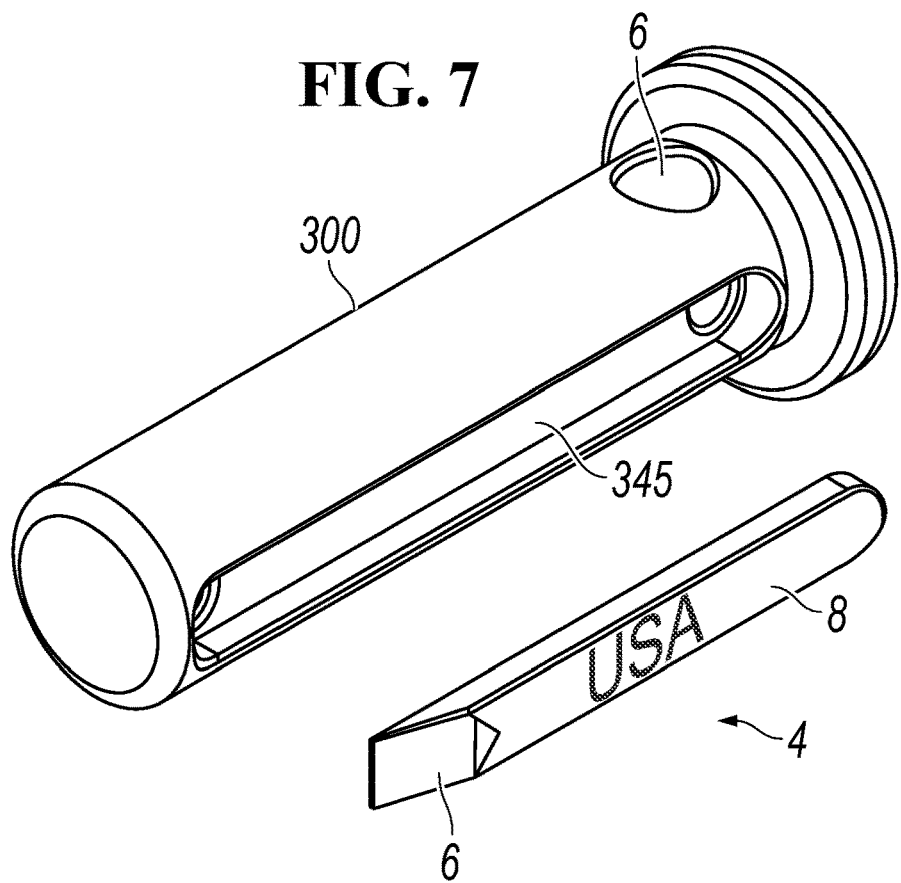
FIGS. 8A-8E are illustrative embodiments of a removal tool and takedown pin.
Figure 8B:
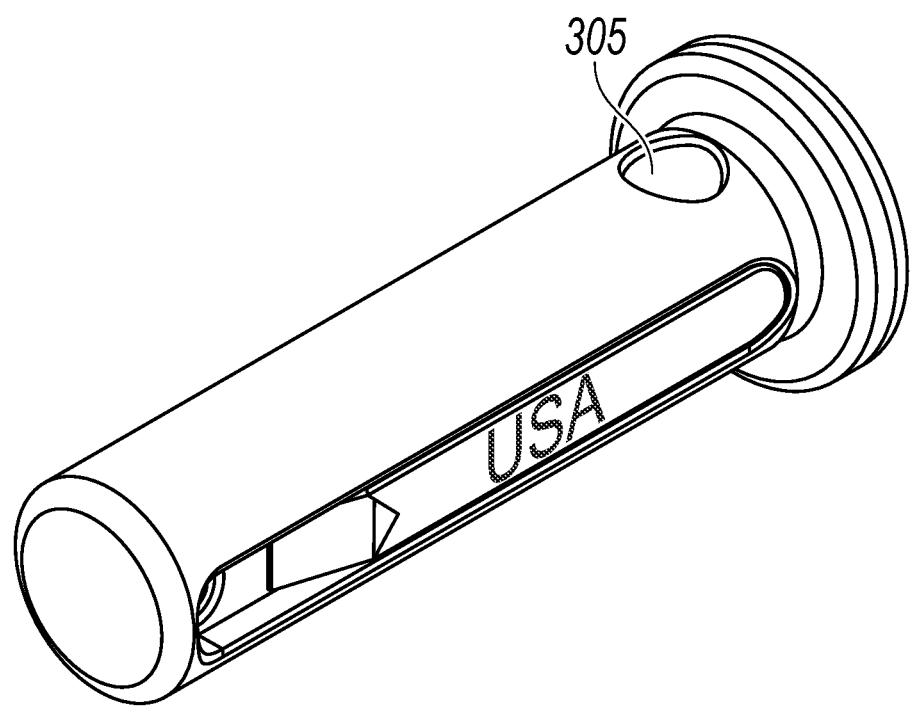
Figure 8C:
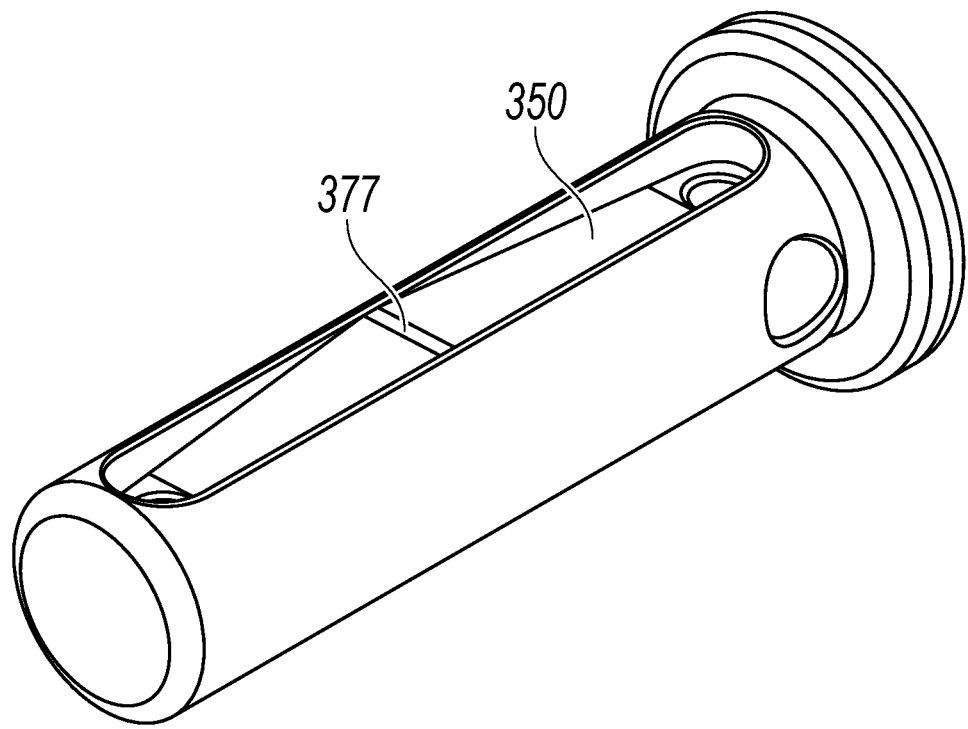
Figure 8D:
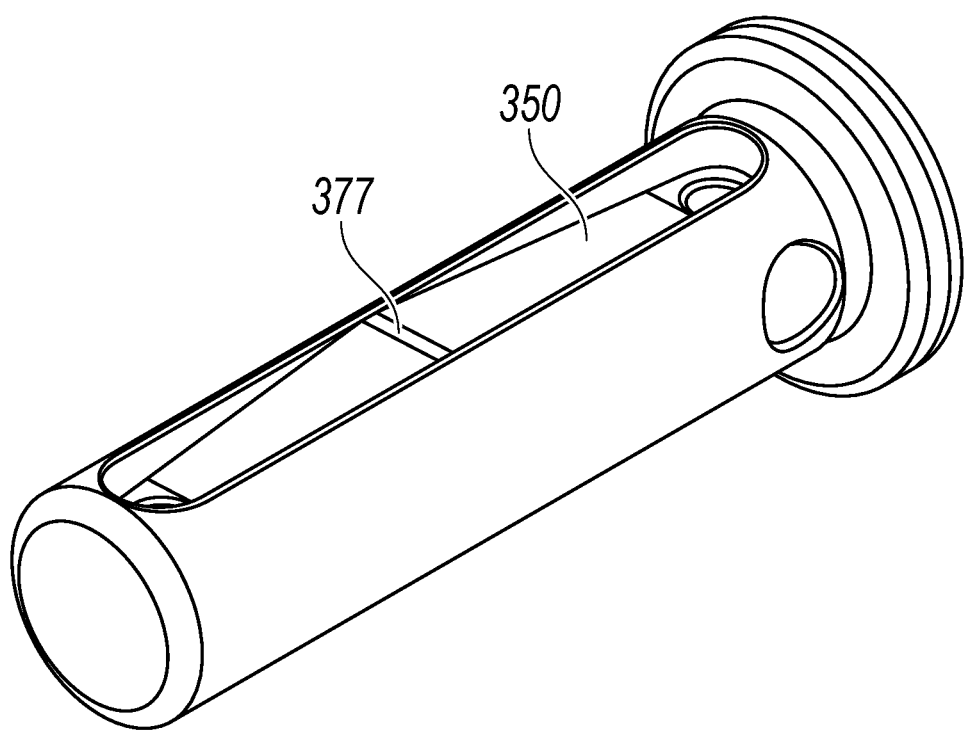
Figure 8E:
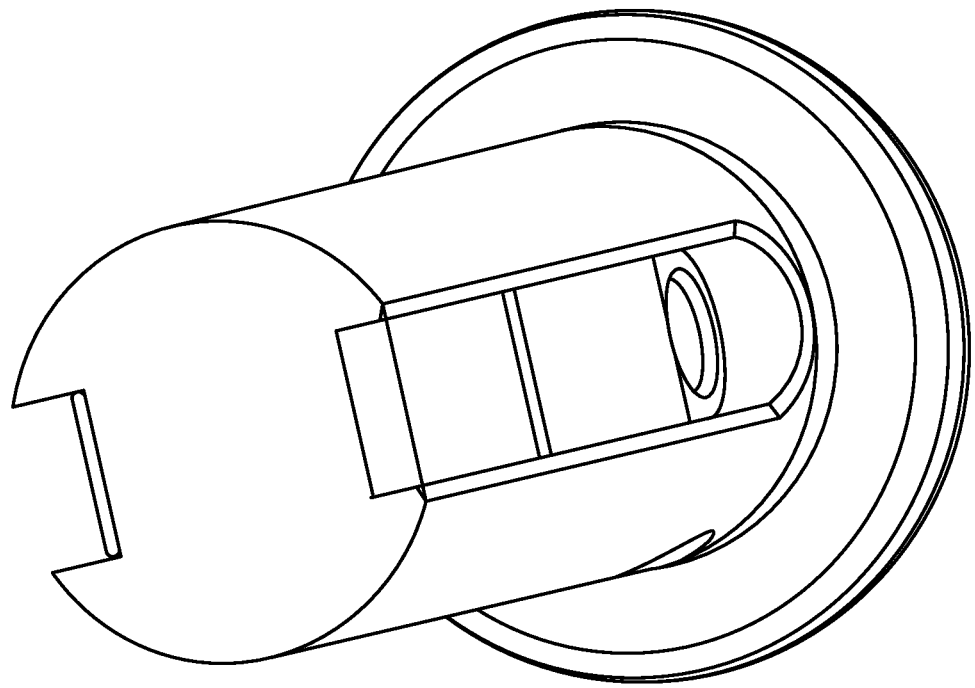

FIGS. 8A-8E are illustrative embodiments of a removal tool 4 and takedown pin 300. It should be recognized that while this example discusses a takedown pin, the designs discussed herein may also be applied to a pivot pin. FIG. 8A a shows an exploded side view of the takedown pin 300 and removal tool 4. A storage cavity 345 provided by the takedown pin 300 may be may receive the removal tool 4 as shown in FIG. 8B. The storage cavity 345 may also be optionally utilized as the detent pin retention channel if desired and may provide features often present in conventional channels of pivot or takedown pins, such as openings for retaining the detent pin. In some embodiments, the tip of the detent pin engaging the improved channel may be chamfered, filleted or the like to ease disengagement. Additionally, the takedown pin 300 may also provide a channel 350 (or improved channel herein to avoid confusion) as shown in FIGS. 8C and 8D. The improved channel 350 may provide a shallow portion 377 where the channel rises towards the outer surface of the shank to aid disengagement of the detent pin from the improved channel. It shall be recognized that this design is similar to FIG. 5A, and various features of these designs and others may be interchangeable with each other. In other embodiments, the improved channel 350 may be substituted with any of the improved designs discussed previously above. It should be noted that the shallow portion 377 does not need to meet the outer surface of the shank as in FIG. 5A, and may merely rise to small depth from the outer surface of the shank that allows the detent to be dislodged from the channel with a moderate amount of force. In some embodiments, the top edge of the improved channel 350 may be chamfered, filleted, or the like, which ease disengagement of the detent pin from the improved channel (e.g. FIG. 8E). The shallow portion 377 merely needs to rise sufficiently so that the chamfered or filleted edge engages the non-cylindrical portion of the detent pin tip, thereby allowing it to be dislodged with a moderate amount of force. The top and bottom portions of central channel 375 gradually increase in depth as they move away from the shallow portion 377 of the channel. In the embodiment shown, the storage cavity 345 and improved channel 350 are position 180° from each on the shank, but may be positioned at different locations that do not interfere with other channels as discussed previously above.

In some embodiments, the takedown pin 300 may optionally include a safe lock hole 305, which may partially extend into the shank or pass through the entire shank. The safe lock hole 305 may be utilized to lock the takedown pin 300 to the lower receiver. It should be noted that the safe lock hole 305 does not allow removal of the takedown pin 300 without removal of the castle nut and end plate of the firearm. This may particularly be desirable for competitions or the like where it may be desirable to lock the firearm after inspection to prevent unwanted modification. Further, when a user wishes to prevent final assembly, he or she may place a pivot pin, takedown pin, or both into the lower receiver with the detent pin engaging the safe lock hole 305 without the upper receiver or upper portion of the firearm installed. In some embodiments, the safe lock hole may be incorporate into a pivot pin. Further, the safe lock hole may be incorporated in to any of the designs discussed previously above.

In yet another embodiment, a takedown pin or pivot pin may provide a channel, including any of the channels discussed above, with chamfered, filleted, or the like edges near the top surface of the shank. The detent pin may be tapered at the tip that engages the channel of the takedown or pivot pin. In a conventional pivot or takedown pin, the sidewalls are straight and prevent rotation of the pin because the cylindrical portion of the detent pin (rather that the tapered portion of the tip) engages the straight sidewalls. When the edges of the channel are chamfered, filleted, or the like, these edges may engage the tapered portion of the tip depending on the depth of the channel. In the prior embodiment discussing a shallow portion 377 of the channel, this shallow portion pushes the detent pin into the lower receiver so that the tapered tip can engage the chamfered, filleted, or similarly modified edges of the channel. Due to the tapered tip and modified edges, the interface is not flat and sufficient force allows the detent to disengage from the channel. In other embodiment, the channel may be shallow, except near the openings at opposite ends of the channel for securing the detent pin. The channel is sufficiently shallow to allow tapered tip of the detent pin to interface with the chamfered, filleted, or similarly modified edges of the channel at nearly any point along the length of the channel, except near the openings for securing the detent pin.

In addition to the embodiments discussed above, it should be apparent that various combinations may be possible from the various design aspects discussed above. In some embodiments, the pivot or takedown pin may comprise three channels. A first channel may be a storage cavity or conventional channel of a pivot or takedown pin. The second channel may be an improved channel, such as the channels discussed above. The third channel may be a safety lock hole.

Discussion of Further Design Variations

Figure 9:
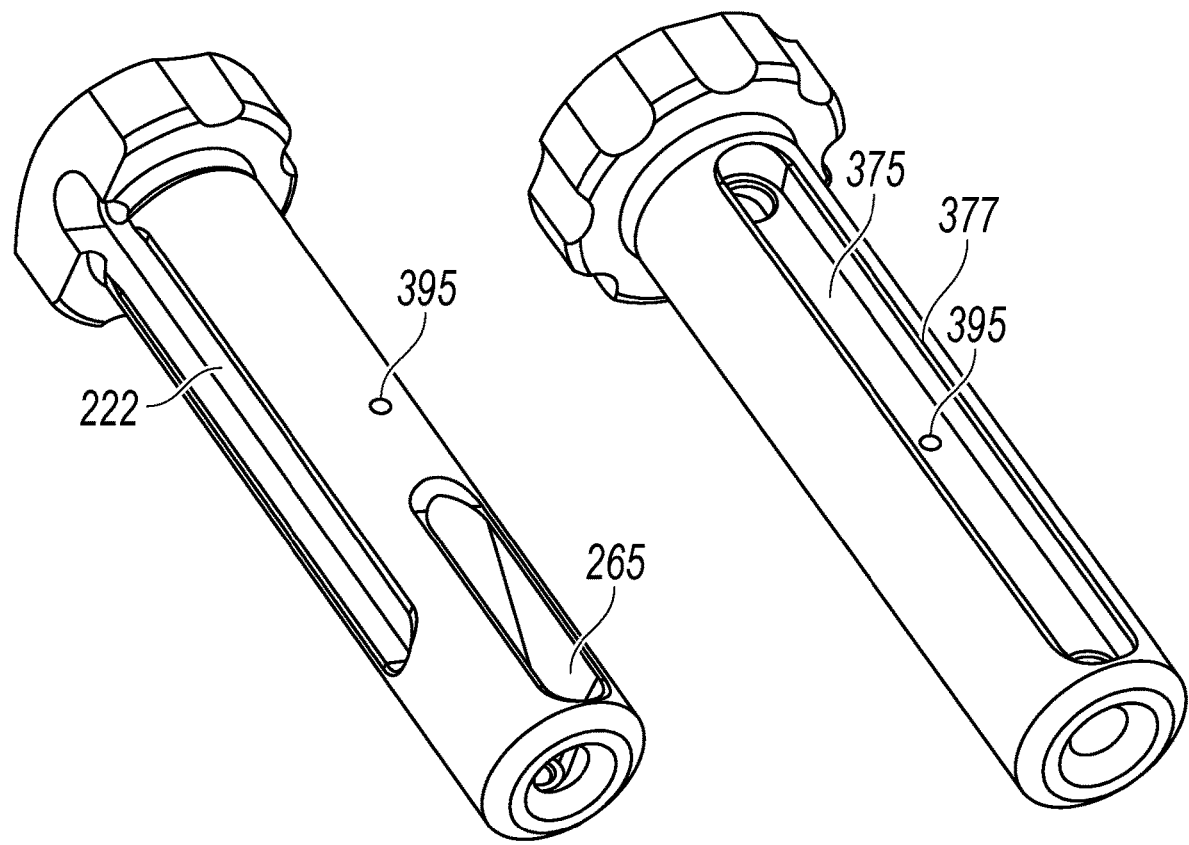
FIG. 9 is an illustrative embodiment of pivot and takedown pins.

FIG. 9 shows illustrative embodiments of a pivot (left) and takedown (right) pin. As channel 222 of the pivot pin is similar to central channel 375, it shall be understood that discussion of the features of channel 375 are also present in channel 222 and are not repeated for brevity. Channel 375 provides varying depth as discussed previously regarding FIGS. 5A & 8C. The upper portion near the head and the lower portion of channel 375 both have a greater depth than the middle. The depth of the upper and lower portions may gradually reduce depth towards the middle or shallow portion 377 of channel 375. The shallow portion 377 may have a very small depth or no depth (meaning it meets the outer diameter of the shank). In some embodiments, the shallow portion 377 may be flat or the channel shoulders are absent. While channel 375 is a straight channel in the embodiment shown, other embodiments may be curved or helical. As discussed previously, channel 375 acts as a combined central channel and removal channel, where shallow portion 377 allows a detent to be disengaged from channel 375. In some embodiments, it may be desirable to include and installation channel. For example, the pivot pin may optionally include an installation channel 265 discussed previously regarding FIG. 3B (while shown as a straight channel in FIG. 9, other embodiments may be curved as shown in FIG. 3B). The installation channel 265 may provide seat, machined depression, or be shaped in a manner that is suitable for temporarily holding the detent desired position during installation.

In some cases, prior art pins utilize an aftermarket detent 35 with varying diameter, which allows a portion of the detent to fit within the spring 30 securely. This allows the spring 30 to secure the detent 35 during installation. However, this pivot pin and the various pins discussed herein do not require such aftermarket detents and can be utilized with OEM detents.

Further, the pins may also provide shallow indention(s) 395, which may act as tactile position markers of where the dent is located. For example, the indention 395 may be located in the shallow portion 377 of channel 375 (or channel 222). As another example, an indention 395 may be provided along the pathway of installation channel 265 corresponding shank position of the shallow portion 377, thereby providing an indication to the user shank positioning suitable for reaching the shallow portion 377 with a simple twist of the pin. Notably, the indention 395 in the shallow portion 377 provides an indication to the user of when the shallow portion has been reached.

In some embodiments, a pivot pin serves as part of a weapon. The purpose of the pin is to hold two major parts of the weapon together, said pin having two or more channels in the surface of its major diameter, including various combinations of the channels discussed further herein. The optional first channel, which is the installation channel, is not connected to the other two channels. The optional second channel, which is the deinstallation channel, is connected to the third channel, which is the main channel. The main channel, which is preferably present in all embodiments, has an indentation at each end which is intended to serve as a detent. The installation channel comprises a groove in which the tip of a detent pin is retained while the pin is installed into the weapon. In some embodiments, the deinstallation channel comprises a groove in which the tip of the detent pin is retained when the pin moved in such a way to remove the detent pin from the main channel.

A pin, such as the pivot pin, where the installation channel includes an indentation which holds the detent pin until the pin and the detent pin are inserted into the weapon. In some embodiments, the main channel of the pin is straight, taking a path parallel to the pin's main axis. In some embodiments, the main channel of the pin is helical, taking a path that wraps around the circumference of the pin as it traverses a path in the direction of the pin's axis.

In some embodiments, the pivot or takedown pin body is hollow, is made from a metal that is substantially lower in density than steel, is made from a polymer, is made from porcelain, is machined, is cast, is molded, or any combination thereof. In some embodiments, the pivot or takedown pin has head at one end with a larger perimeter or diameter than the pin's cylindrical body or a pin which does include such a portion.

In some embodiments, the head and shank are manufactured separately for the pivot or takedown pin, the head being affixable after manufacture. Further, the head and shank are of the same material or different material. In some embodiments, the surface finish stays the same throughout the length or changes from one region of the pivot or takedown pin. In some embodiments, the pivot or takedown pin may provide a profile where the main channel is substantially v-shaped at the bottom and/or aids the movement of the detent pin out of the indention at either end and into the main channel.

In some embodiments, the intersection of the deinstallation channel and the main channel is located approximately in the middle of the main channel. In some embodiments, the intersection of the deinstallation channel and the main channel is in between ⅓ to ⅔ of the length of the shank. In some embodiments, the intersection of the deinstallation channel and the main channel is in between ¼ to ¾ of the length of the shank. In some embodiments, the pin may provide an indicator to aid in determining when the detent pin is located at the intersection of the main channel and the deinstallation channel, said indicator being visual, tactile, or auditory.

In some embodiments, a pin having two channels in the surface of its major diameter. The first channel, which is the installation channel, is not connected to the other channel. The second channel is the main channel. The main channel has an indentation at each end which is intended to serve as a detent. The installation channel comprises a groove in which the tip of a detent pin is retained while the pin is installed into the weapon. The depth of the main channel varies along the length of the pin so that at a region near the center of the channel's length, the channel's depth is so shallow that the pin may be rotated to cause the detent pin to disengage from the channel. In some embodiments, the pin may only have the main channel. In some embodiments, the indention in the installation channel holds the detent pin at an angle which aids insertion of the detent pin into the weapon's detent pin hole.

In some embodiments, a reinstallation tool may be provided. The reinstallation tool can be inserted into the pin hole of a weapon in order to simultaneously retract a detent pin and receive a pivot or takedown pin. In some embodiments, the tool receives the leader pin by threading into the end of the leader pin. In some embodiments, the tool is keyed to match the pin and/or the weapon so that a specific tool is required for installation of the leader pin.

In some embodiments, a system including one or more pins as described previously above, which allow assembly of a weapon with no tools. In some embodiments, the pin is keyed to match a specific keyed design of a particular firearm model, where non-matching keying prevents the pin from being installed in firearms different from the particular firearm model. In some embodiments, the firearm is disabled upon the removal of one or more of the pins as described above.

In some embodiments, the keying of the pin(s) prevents installation of pins except those keyed to match a particular firearm. As an example, the keying of the pins is unique to where the keyed pins cannot be installed in another firearm, even one of the same model, and can only be installed in the matching firearm. It shall be appreciated that the pins of the system may optionally include any of the various features of the pins discussed above.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A pin for a firearm, the pin comprising:
a head; and
a shank extending from the head that is cylindrically shaped, wherein the shank comprises
a central channel extending from the head toward a distal end of the shank, wherein the central channel provides
a starting portion of the central channel with a first depth,
an ending portion of the central channel with a second depth, and
an intermediate portion of the central channel with a third depth shallower than both the first depth and second depth, wherein the first depth and the second depth reduce in depth when approaching the intermediate portion.

2. The pin of claim 1, wherein the third depth meets the outer diameter of the shank.

3. The pin of claim 1, wherein the third depth allows the pin to be rotated when a detent is aligned with the intermediate portion, and allows the detent to be disengaged from the central channel.

4. The pin of claim 1, wherein the central channel is straight, helical or angled.

5. The pin of claim 1, wherein the shank of the pin further comprises an installation channel near the tip of the pin for installing a pin in a firearm.

6. The pin of claim 5, wherein the installation channel is straight, helical or angled.

7. The pin of claim 5, wherein the installation channel is separate and distinct from the central channel.

8. The pin of claim 1, wherein the shank further comprises a removal channel intersecting the central channel, wherein the removal channel allows the pin to be removed from the firearm.

9. The pin of claim 8, wherein the removal channel is positioned in between top and bottom ends of the central channel.

10. The pin of claim 8, where the removal channel is a straight, helical, or angled channel.

11. The pin of claim 9, wherein the removal channel rises or reduces depth until reaching an outer diameter of the shank.

12. The pin of claim 8, wherein the removal channel runs clockwise or counterclockwise around the shank.

13. The pin of claim 8, wherein the removal channel runs less than 360 degrees around the shank.

14. The pin of claim 8, wherein the removal channel and the central channel share a common depth an intersection point when the removal and central channels meet.

15. A pin for a firearm, the pin comprising:
a head; and
a shank extending from the head that is cylindrically shaped, wherein the shank comprises
a central channel extending from the head toward a distal end of the shank, and
an installation channel starting near a tip of the distal end of the shank opposite the head, wherein the installation channel provides an installation point that is closer to the tip than the central channel, the installation channel gradually varies from a maximum depth at the installation point to meet an outer diameter of the shank, and the installation channel extends to a depth suitable for loosely securing a detent for installation into the firearm.

16. The pin of claim 15, wherein the installation channel is distinct and separate from the central channel.

17. The pin of claim 15, wherein the installation channel rises or reduces in depth toward the head to reach an outer diameter of the shank.

18. The pin of claim 15, wherein the shank further comprises a removal channel intersecting the central channel, wherein the removal channel is positioned in between top and bottom ends of the central channel.

19. The pin of claim 18, wherein the removal channel rises or reduces depth until reaching an outer diameter of the shank.

20. The pin of claim 19, wherein the central channel provides
a starting portion with a first depth;
an ending portion with a second depth; and
an intermediate portion with a third depth shallower than the first depth and second depth, wherein the first depth and the second depth reduce toward the intermediate portion.

21. The pin of claim 15, wherein the maximum depth of the installation channel is suitable for loosely holding the detent in an upright position for installation into the firearm.

* * * * *